(12) United States Patent
Kooriya et al.

(10) Patent No.: US 10,341,532 B2
(45) Date of Patent: Jul. 2, 2019

(54) IMAGE FORMING APPARATUS, IMAGE FORMING METHOD, AND PROGRAM

(71) Applicant: KONICA MINOLTA, INC., Chiyoda-ku, Tokyo (JP)

(72) Inventors: Takaaki Kooriya, Hachioji (JP); Daiki Yamanaka, Sagamihara (JP); Hiroshige Kidera, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/959,449

(22) Filed: Apr. 23, 2018

(65) Prior Publication Data

US 2018/0332194 A1 Nov. 15, 2018

(30) Foreign Application Priority Data

May 11, 2017 (JP) .................................. 2017-094921

(51) Int. Cl.
*H04N 1/60* (2006.01)
*H04N 1/58* (2006.01)

(52) U.S. Cl.
CPC ............. *H04N 1/6027* (2013.01); *H04N 1/58* (2013.01); *H04N 1/603* (2013.01); *H04N 1/6019* (2013.01); *H04N 1/6047* (2013.01)

(58) Field of Classification Search
USPC ....................................................... 358/3.21
See application file for complete search history.

(56) References Cited

U.S. PATENT DOCUMENTS

| 8,035,859 | B2 | 10/2011 | Kusunoki | |
|---|---|---|---|---|
| 8,036,716 | B2* | 10/2011 | Dunn | H04W 4/90 455/570 |
| 8,368,716 | B2* | 2/2013 | Moroney | G09G 5/02 345/604 |

(Continued)

FOREIGN PATENT DOCUMENTS

| JP | H1175067 A | 3/1999 |
|---|---|---|
| JP | 2008224845 A | 9/2008 |

OTHER PUBLICATIONS

Hiroyuki, Image Processing Unit and Its Method, Mar. 16, 1999, Japanese Patent Application Publication, H 11-075067, All Pages. (Year: 1999).*

*Primary Examiner* — Ngon B Nguyen
(74) *Attorney, Agent, or Firm* — Holtz, Holtz & Volek PC

(57) ABSTRACT

An image forming apparatus that forms an output image corresponding to input image data on an image carrier by superimposing toner images of colors, includes a hardware processor that: detects color information of the output image for every pixel region; converts color information of the input image data for every pixel region and color information of the output image for every pixel region into indexes which define colors in predetermined color space coordinates; extracts a pixel region in which the color information of the output image is different from the color information of the input image data, and corrects the color information of the input image data with respect to the extracted pixel region; and stores the color information of the input image data as data for calibration in combination with the color information of the output image and image forming conditions when forming the output image.

16 Claims, 19 Drawing Sheets

(56) References Cited

U.S. PATENT DOCUMENTS

| | | | |
|---|---|---|---|
| 2007/0165257 A1* | 7/2007 | Owaku | H04N 1/00002 |
| | | | 358/1.9 |
| 2008/0137942 A1* | 6/2008 | Hong | H04N 1/62 |
| | | | 382/164 |
| 2008/0144141 A1* | 6/2008 | Tai | H04N 1/603 |
| | | | 358/518 |
| 2012/0274986 A1* | 11/2012 | Harashima | H04N 1/60 |
| | | | 358/3.21 |

* cited by examiner

FIG. 5

| IMAGE DATA | COLOR CONFIGURATION | | | | ANGLE h | | | DISTANCE d | | |
|---|---|---|---|---|---|---|---|---|---|---|
| | Y | M | C | K | REFERENCE VALUE | THRESHOLD VALUE+ | THRESHOLD VALUE− | REFERENCE VALUE | THRESHOLD VALUE+ | THRESHOLD VALUE− |
| Y | O | — | — | — | 95.3 | 105.3 | 85.3 | 98.9 | 108.9 | 88.9 |
| M | — | O | — | — | 358.9 | 8.9 | 348.9 | 76.7 | 86.7 | 66.7 |
| C | — | — | O | — | 239.1 | 249.1 | 229.1 | 63.5 | 73.5 | 53.5 |
| K | — | — | — | O | — | — | — | 0.2 | 10.2 | 0.0 |
| R* | O | O | — | — | 39.5 | 49.5 | 29.5 | 88.5 | 98.5 | 78.5 |
| G* | O | — | O | — | 159.2 | 169.2 | 149.2 | 79.1 | 89.1 | 69.1 |
| B* | — | O | O | — | 300.0 | 310.0 | 290.0 | 50.0 | 60.0 | 40.0 |
| 3C* | O | O | O | — | — | — | — | 1.9 | 11.9 | 0 |

*SINGLE COLOR CONFIGURATION RATIO OF MULTICOLOR IS THE SAME

FIG. 6

| | PIXEL COORDINATES | | INPUT DATA VALUE [%] | | | | | MEASUREMENT VALUE | | | | MEASUREMENT VALUE | | INPUT DATA VALUE | | Δh (=h2−h1) |
|---|---|---|---|---|---|---|---|---|---|---|---|---|---|---|---|---|
| | MAIN | SUB | Y | M | C | K | L | a | b | h2 | d2 | h1 | d1 | | | |
| (1) | 1 | 2 | 0 | 100 | 0 | 0 | 44.6 | 76.8 | −1.5 | 358.9 | 76.8 | 358.9 | 76.7 | 0.0 |
| (2) | 2 | 2 | 0 | 100 | 0 | 0 | 14.5 | 25.0 | −42.3 | 300.6 | 49.1 | 358.9 | 76.7 | −58.3 |
| (3) | 3 | 2 | 0 | 0 | 100 | 0 | 47.8 | −32.6 | −54.3 | 239.0 | 63.3 | 239.1 | 63.5 | −0.1 |
| (4) | 4 | 2 | 0 | 0 | 100 | 0 | 47.4 | −32.4 | −54.4 | 239.2 | 63.3 | 239.1 | 63.5 | 0.1 |
| (5) | 5 | 2 | 0 | 0 | 100 | 0 | 94.2 | 0.0 | 0.5 | 92.2 | 0.5 | 239.1 | 63.5 | −146.9 |
| (6) | 6 | 2 | 0 | 100 | 0 | 0 | 44.9 | 76.4 | −1.4 | 359.0 | 76.4 | 358.9 | 76.7 | 0.0 |
| (7) | 7 | 2 | 0 | 100 | 0 | 0 | 44.5 | 76.3 | −1.3 | 359.0 | 76.3 | 358.9 | 76.7 | 0.1 |

| INPUT COLOR | SYMBOL OF Δh | CLOSE COLOR | CORRECTION TARGET COLOR |
|---|---|---|---|
| Y | + | G | C |
| Y | − | R | M |
| M | + | R | Y |
| M | − | B | C |
| C | + | B | M |
| C | − | G | Y |

| | PIXEL COORDINATES | | INPUT DATA VALUE [%] | | | |
|---|---|---|---|---|---|---|
| | MAIN | SUB | Y | M | C | K |
| (1) | 1 | 2 | 0 | 100 | 0 | 0 |
| (2) | 2 | 2 | 0 | 100 | 0 | 0 |
| (3) | 3 | 2 | 0 | 0 | 100 | 0 |
| (4) | 4 | 2 | 0 | 0 | 100 | 0 |
| (5) | 5 | 2 | 0 | 0 | 100 | 0 |
| (6) | 6 | 2 | 0 | 100 | 0 | 0 |
| (7) | 7 | 2 | 0 | 100 | 0 | 0 |

| | PIXEL COORDINATES | | INPUT DATA VALUE [%] | | | |
|---|---|---|---|---|---|---|
| | MAIN | SUB | Y | M | C | K |
| (1) | 1 | 2 | 0 | 100 | 0 | 0 |
| (2) | 2 | 2 | 0 | 100 | 99 | 0 |
| (3) | 3 | 2 | 0 | 0 | 100 | 0 |
| (4) | 4 | 2 | 0 | 0 | 100 | 0 |
| (5) | 5 | 2 | 0 | 0 | 100 | 0 |
| (6) | 6 | 2 | 0 | 100 | 0 | 0 |
| (7) | 7 | 2 | 0 | 100 | 0 | 0 |

FIG. 11

| | PIXEL COORDINATES | | INPUT DATA VALUE [%] | | | | MEASUREMENT VALUE | | | | MEASUREMENT VALUE | | INPUT DATA VALUE | | Δh (=h2−h1) |
|---|---|---|---|---|---|---|---|---|---|---|---|---|---|---|---|
| | MAIN | SUB | Y | M | C | K | L | a | b | h2 | d2 | h1 | d1 | |
| (1) | 1 | 2 | 100 | 0 | 0 | 0 | 89.1 | −9.1 | 98.5 | 95.3 | 98.9 | 95.3 | 98.9 | 0.0 |
| (2) | 2 | 2 | 100 | 0 | 0 | 0 | 89.1 | −9.1 | 98.5 | 95.3 | 98.9 | 95.3 | 98.9 | 0.0 |
| (3) | 3 | 2 | 100 | 0 | 0 | 0 | 65.0 | −17.0 | 50.0 | 108.8 | 52.8 | 95.3 | 98.9 | 13.5 |
| (4) | 4 | 2 | 0 | 0 | 100 | 0 | 55.0 | −27.0 | −45.8 | 239.5 | 53.2 | 239.1 | 63.5 | 0.4 |
| (5) | 5 | 2 | 0 | 0 | 100 | 0 | 47.4 | −32.4 | −54.4 | 239.2 | 63.3 | 239.1 | 63.5 | 0.1 |
| (6) | 6 | 2 | 0 | 0 | 100 | 0 | 47.7 | −32.5 | −54.3 | 239.1 | 63.3 | 239.1 | 63.5 | 0.0 |
| (7) | 7 | 2 | 0 | 0 | 100 | 0 | 47.5 | −32.4 | −54.5 | 239.3 | 63.4 | 239.1 | 63.5 | 0.1 |

| PIXEL COORDINATES | | INPUT DATA VALUE [%] | | | |
|---|---|---|---|---|---|
| MAIN | SUB | Y | M | C | K |
| (1) 1 | 2 | 100 | 0 | 0 | 0 |
| (2) 2 | 2 | 100 | 0 | 0 | 0 |
| (3) 3 | 2 | 100 | 0 | 0 | 0 |
| (4) 4 | 2 | 0 | 0 | 100 | 0 |
| (5) 5 | 2 | 0 | 0 | 100 | 0 |
| (6) 6 | 2 | 0 | 0 | 100 | 0 |
| (7) 7 | 2 | 0 | 0 | 100 | 0 |

| PIXEL COORDINATES | | INPUT DATA VALUE [%] | | | |
|---|---|---|---|---|---|
| MAIN | SUB | Y | M | C | K |
| (1) 1 | 2 | 100 | 0 | 0 | 0 |
| (2) 2 | 2 | 100 | 0 | 0 | 0 |
| (3) 3 | 2 | 100 | 0 | 21 | 0 |
| (4) 4 | 2 | 0 | 0 | 79 | 0 |
| (5) 5 | 2 | 0 | 0 | 100 | 0 |
| (6) 6 | 2 | 0 | 0 | 100 | 0 |
| (7) 7 | 2 | 0 | 0 | 100 | 0 |

FIG. 15

| PIXEL COORDINATES | | INPUT DATA VALUE [%] | | | | MEASUREMENT VALUE | | | MEASUREMENT VALUE | | INPUT DATA VALUE | | Δh (=h2−h1) | Δd (=d2−d1) |
|---|---|---|---|---|---|---|---|---|---|---|---|---|---|---|
| MAIN | SUB | Y | M | C | K | L | a | b | h2 | d2 | h1 | d1 | | |
| (1) 1 | 2 | 100 | 0 | 0 | 0 | 79.1 | −8.6 | 86.2 | 95.7 | 86.6 | 95.3 | 98.9 | | −12.3 |
| (2) 2 | 2 | 100 | 0 | 0 | 0 | 79.2 | −8.5 | 86.0 | 95.6 | 86.4 | 95.3 | 98.9 | | −12.5 |
| (3) 3 | 2 | 100 | 0 | 0 | 0 | 65.0 | −17.0 | 50.0 | 108.8 | 52.8 | 95.3 | 98.9 | 13.5 | |
| (4) 4 | 2 | 0 | 0 | 100 | 0 | 55.0 | −27.0 | −45.8 | 239.5 | 53.2 | 239.1 | 63.5 | 0.4 | |
| (5) 5 | 2 | 0 | 0 | 100 | 0 | 47.4 | −32.4 | −54.4 | 239.2 | 63.3 | 239.1 | 63.5 | | −0.1 |
| (6) 6 | 2 | 0 | 0 | 100 | 0 | 47.7 | −32.5 | −54.3 | 239.1 | 63.3 | 239.1 | 63.5 | | −0.2 |
| (7) 7 | 2 | 0 | 0 | 100 | 0 | 47.5 | −32.4 | −54.5 | 239.3 | 63.4 | 239.1 | 63.5 | | −0.1 |

A1: (1)–(2), A2: (3)–(4), A3: (5)–(7)

| | PIXEL COORDINATES | | INPUT DATA VALUE [%] | | | |
|---|---|---|---|---|---|---|
| | MAIN | SUB | Y | M | C | K |
| (1) | 1 | 2 | 100 | 0 | 0 | 0 |
| (2) | 2 | 2 | 100 | 0 | 0 | 0 |
| (3) | 3 | 2 | 100 | 0 | 0 | 0 |
| (4) | 4 | 2 | 0 | 0 | 100 | 0 |
| (5) | 5 | 2 | 0 | 0 | 100 | 0 |
| (6) | 6 | 2 | 0 | 0 | 100 | 0 |
| (7) | 7 | 2 | 0 | 0 | 100 | 0 |

| | PIXEL COORDINATES | | INPUT DATA VALUE [%] | | | |
|---|---|---|---|---|---|---|
| | MAIN | SUB | Y | M | C | K |
| (1) | 1 | 2 | 100 | 0 | 0 | 0 |
| (2) | 2 | 2 | 100 | 0 | 0 | 0 |
| (3) | 3 | 2 | 100 | 0 | 18 | 0 |
| (4) | 4 | 2 | 0 | 0 | 100 | 0 |
| (5) | 5 | 2 | 0 | 0 | 100 | 0 |
| (6) | 6 | 2 | 0 | 0 | 100 | 0 |
| (7) | 7 | 2 | 0 | 0 | 100 | 0 |

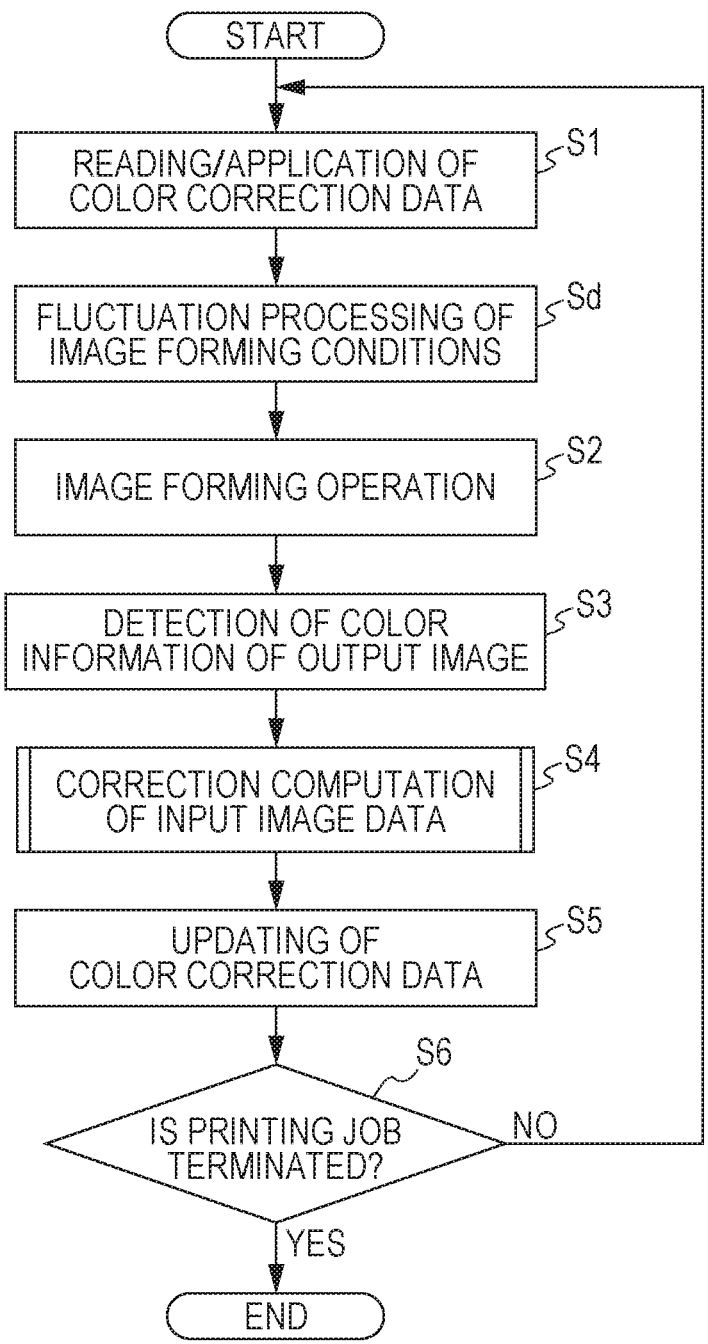

IMAGE FORMING APPARATUS, IMAGE FORMING METHOD, AND PROGRAM

The entire disclosure of Japanese patent Application No. 2017-094921, filed on May 11, 2017, is incorporated herein by reference in its entirety.

BACKGROUND

Technological Field

The present disclosure relates to an image forming apparatus, an image forming method, and a program.

Description of the Related Art

In the related art, in color image forming apparatus (a copier, a printer, a facsimile, and the like) using an electrophotographic process technology, an intermediate transfer method using an intermediate transfer body such as an intermediate transfer belt becomes the main stream. The intermediate transfer method is a method in which toner images, which are respectively formed on photoconductor drums, of respective colors of C (cyan), magenta (M), yellow (Y), black (K), and the like are transferred (primarily transferred) to the intermediate transfer body, and the toner images of four colors are superimposed on the intermediate transfer body and are transferred (secondarily transferred) to a sheet.

In the image forming apparatus, there is a problem that an image quality of an output image (image output to a sheet) varies due to deterioration of the photoconductor drum, a developer, and the like with the passage of time, an environment (a fluctuation in temperature and humidity), and the like at the periphery of the apparatus. Specifically, a phenomenon in which color information (for example, gradation properties, hues, and the like) of input image data is not accurately reproduced occurs (also referred to as "color reproducibility"), Here, in the image forming apparatuses in the related art, calibration processing is performed so as to stably reproduce the color information of the input image data on the output image. Examples of the calibration processing include a method in which color information of an output image transferred to a sheet is detected by a color sensor provided on a sheet conveying path, gradation correction data (so-called gamma correction curve) is generated on the basis of the detection result, and feedback to image forming conditions such as a charging potential, a developing potential, and the amount of exposure is performed in accordance with the gradation correction data.

For example, JP 2008-224845 A and JP 11-075067 A disclose a technology in which test printing of a patch for test is performed, and calibration is performed on the basis of color information of an output image that is formed at that time.

However, in the calibration described in JP 2008-224845 A and JP 11-075067 A, it is necessary to stop another job so as to perform the test printing of the patch for test, and thus deterioration in productivity is caused. In addition, there is a problem that toner consumption increases due to the test printing of the patch for test.

From the above-described viewpoints, the following method has been examined. In the method, the calibration processing is performed on the basis of color information of input image data for which a printing command is actually issued and color information of an output image has been examined. However, in this case, a color or a gradation, which can be acquired as data for calibration, is limited to the color information of the input image data for which the printing command is actually issued. As a result, there is a problem that it is difficult to acquire data for calibration related to necessary and sufficient color information, and it is difficult to perform calibration with accuracy.

SUMMARY

The present disclosure has been made in view of the above problems, and an object thereof is to provide an image forming apparatus, an image forming method, and a program which are capable of performing calibration with accuracy while suppressing toner consumption and deterioration of productivity.

To achieve the abovementioned object, according to an aspect of the present invention, an image forming apparatus that forms an output image corresponding to input image data on an image carrier by superimposing toner images of a plurality of colors, reflecting one aspect of the present invention comprises a hardware processor that:

detects color information of the output image for every pixel region;

converts color information of the input image data for every pixel region and color information of the output image for every pixel region into indexes which define colors in predetermined color space coordinates;

extracts a pixel region in which the color information of the output image is different from the color information of the input image data, and corrects the color information of the input image data with respect to the extracted pixel region on the basis of the color information of the output image; and stores the color information of the input image data, which is corrected in the hardware processor, as data for calibration in combination with the color information of the output image and image forming conditions when forming the output image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a view illustrating an example of indexes which define colors;

FIG. 6 is a data table illustrating a correlation between the color information of the input image data and the color information of the output image according to the first embodiment;

FIG. 11 is a data table illustrating a correlation between the color information of the input image data and the color information of the output image according to the second embodiment;

FIG. 15 is a data table illustrating a correlation between color information of input image data and color information of an output image according to a third embodiment;

FIG. 22 is a flowchart illustrating an example of an operation of the image forming apparatus according to the fifth embodiment.

DETAILED DESCRIPTION OF EMBODIMENTS

Figure 1:
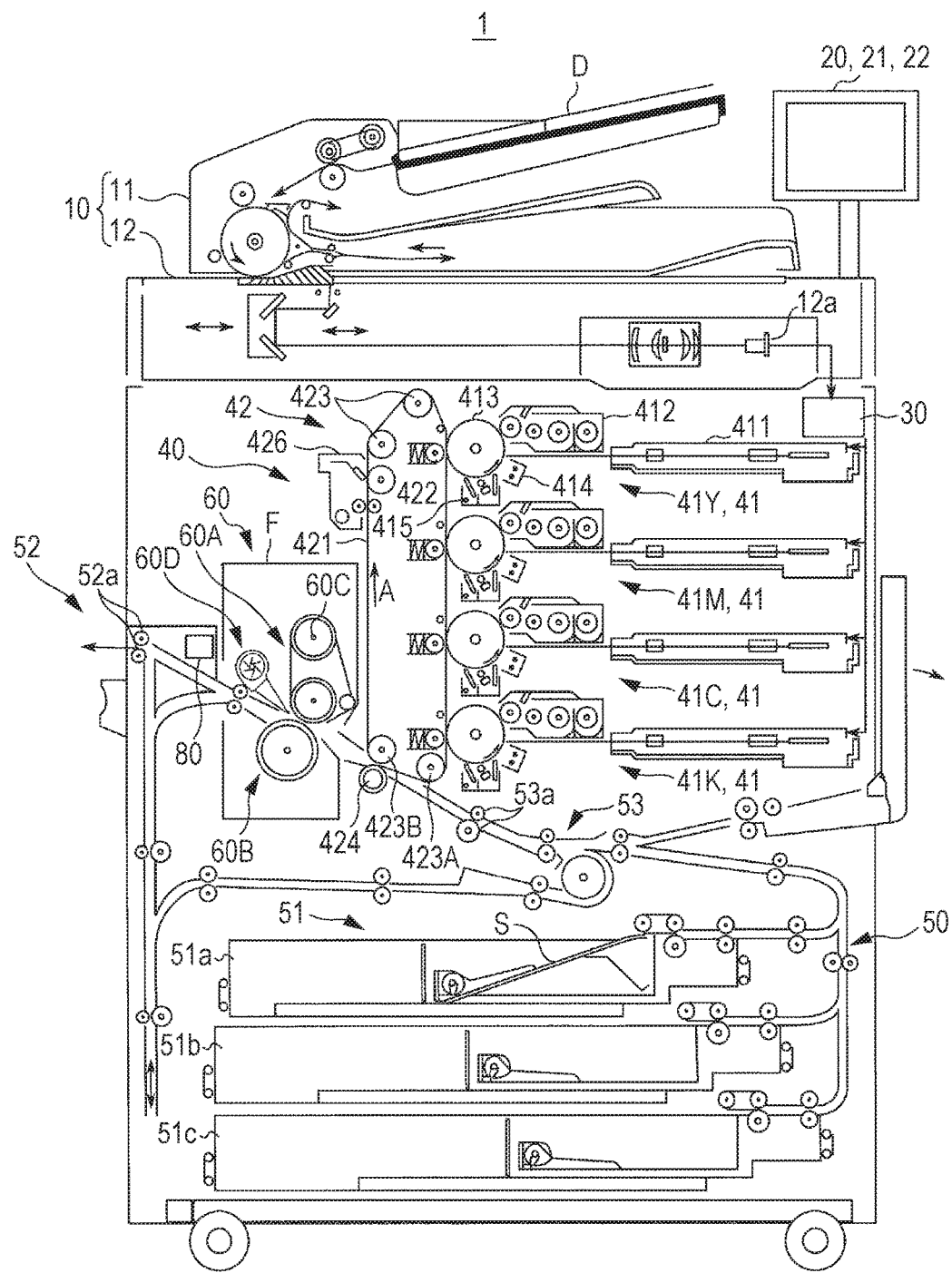
FIG. 1 is a view schematically illustrating an overall configuration of an image forming apparatus according to a first embodiment.

Hereinafter, one or more preferred embodiments of the present invention will be described in detail with reference to the drawings. However, the scope of the invention is not limited to the disclosed embodiments. Furthermore, in this specification and the accompanying drawings, the same reference numeral will be given to a constituent element having substantially the functional configuration, and redundant description thereof will not be repeated.

First Embodiment

[Configuration Example of Image Forming Apparatus]

First, description will be given of an image forming apparatus 1 according to this embodiment. Furthermore, the image forming apparatus 1 according to this embodiment is applied to a copier, a printer, a facsimile, and the like.

Figure 2:
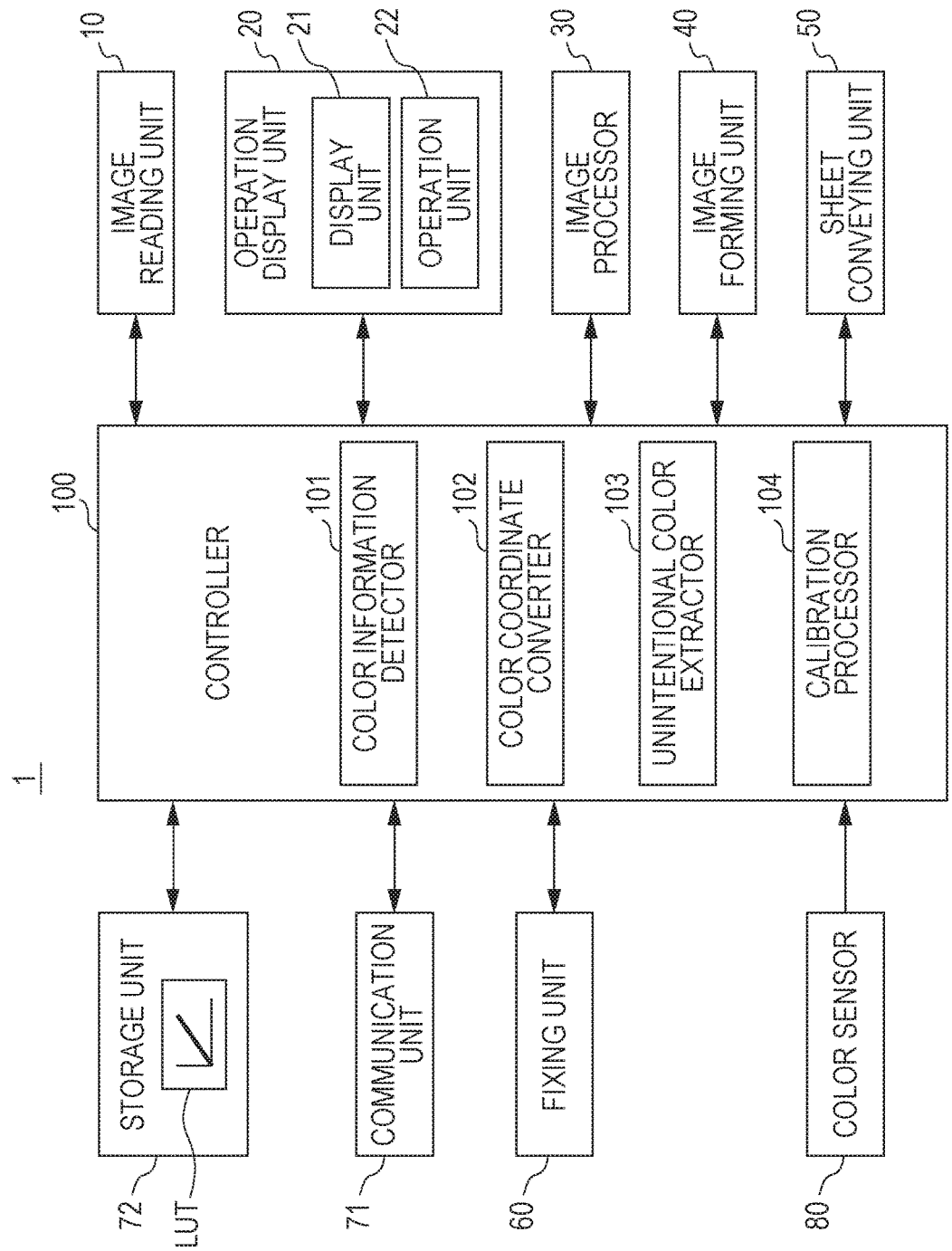
FIG. 2 is a view schematically illustrating an overall configuration of the image forming apparatus according to the first embodiment.

FIG. 1 and FIG. 2 are views schematically illustrating an overall configuration of the image forming apparatus 1 according to the first embodiment.

The image forming apparatus 1 illustrated in FIG. 1 is an intermediate transfer type color image forming apparatus using an electrophotographic process technology. That is, the image forming apparatus 1 primarily transfers toner images, which are respectively formed on photoconductor drums 413, of respective colors of yellow (Y), magenta (M), cyan (C), and Hack (K) to an intermediate transfer belt 421, and the toner images of four colors are superimposed on an intermediate transfer belt 421 and are secondarily transferred to a sheet S to form a toner image.

In addition, the image forming apparatus 1 employs a tandem system in which the photoconductor drums 413 corresponding to four colors of YMCK are disposed in series in a traveling direction of the intermediate transfer belt 421, and toner images of respective colors are sequentially transferred to the intermediate transfer belt 421 in one procedure.

As illustrated in FIG. 2, the image forming apparatus 1 includes an image reading unit 10, an operation display unit 20, an image processor 30, an image forming unit 40, a sheet conveying unit 50, a fixing unit 60, a color sensor 80, a controller 100, and the like.

The controller 100 includes a central processor (CPU), a read only memory (ROM), a random access memory (RAM), and the like. In addition, in the controller 100, the CPU reads a program corresponding to processing contents from the ROM, develops the program in the RAM, and intensively controls an operation of each block of the image forming apparatus 1 in cooperation with the program that is developed. At this time, reference is made to various pieces of data stored in a storage unit 72. For example, the storage unit 72 is constituted by a nonvolatile semiconductor memory (so-called flash memory) or a hard disk drive. However, respectively functions of the controller 100 are not limited to processing by software, and may be realized by a dedicated hardware circuit.

In this embodiment, the controller 100 functions as a color information detector 101, a color coordinate converter 102 an unintentional color extractor 103, and a calibration processor 104. Furthermore, details of functions of the units will be described later.

The controller 100 transmits and receives various pieces of data to and from an eternal device (for example, a personal computer) that is connected to a communication network such as a local area network (LAN) and a wide area network (WAN) through a communication unit 71. For example, the controller 100 receives image data transmitted from the external device, and forms a toner image on a sheet S on the basis of the image data (input image data). For example, the communication unit 71 is constituted by a communication control card such as a LAN card.

The image reading unit 10 includes an automatic document feeding device 11 called an auto document feeder (ADF), a document image scanning device 12 (scanner), and the like.

The automatic document feeding device 11 conveys a document D mounted on a document tray by a conveyance mechanism, and feeds the document D to the document image scanning device 12. The automatic document feeding device 11 can continuously read images (including double sides) of a plurality of sheets of the documents D mounted on the document tray at a time.

The document image scanning device 12 optically scans a document that is conveyed onto contact glass from the automatic document feeding device 11 or a document that is mounted on the contact glass, and forms an image of reflected light from the document on a light receiving surface of a charge coupled device (CCD) sensor 12*a*, and reads a document image. The image reading unit 10 generates input image data on the basis of a reading result by the document image scanning device 12. The input image data is subjected to predetermined image processing in the image processor 30.

For example, the operation display unit 20 is constituted by a liquid crystal display (LCD) including a touch panel, and functions as a display unit 21 and an operation unit 22. The display unit 21 performs display of various operation screens, state display of an image, operation situations of respective functions, and the like in accordance with a display control signal that is input from the controller 100. The operation unit 22 includes various operation keys such as numeric keys and a start key. The operation unit 22 receives various input operations by a user and outputs an operation signal to the controller 100.

The image processor 30 includes a circuit that performs digital image processing corresponding to initial setting or user setting with respect to input image data, and the like. For example, the image processor 30 performs correction processing with respect to input image data on the basis of color correction data (lookup table (LUT)) in the storage unit 72. For example, the image processor 30 performs various kinds of correction processing such as gradation correction, color correction, and shading correction, compression processing, and the like with respect to the input image data on the basis of the color correction data. In addition, the image forming unit 40 is controlled on the basis of image data for which the processing is performed.

The image forming unit 40 includes image forming units 41Y, 41M, 41C, and 41K which respectively form images of color toners of a Y component, an M component, a C component, and a K component on the basis of the input image data, an intermediate transfer unit 42, and the like.

The image forming units 41Y, 41M, 41C, and 41K for the Y component, the M component, the C component, and the K component have the same configuration. Constituent elements which are common are indicated by the same reference numeral for convenience of illustration and description, and when discriminating the constituent elements, Y, M, C, or K is attached to the reference numeral. In FIG. 1, a reference numeral is given to only a constituent element of the image forming unit 41Y for the Y component, and a reference numeral is omitted for constituent elements of the other image forming units 41M, 41C, and 41K.

The image forming unit 41 includes an exposure device 411, a developing device 412, a photoconductor drum 413, a charging device 414, a drum cleaning device 415, and the like.

For example, the photoconductor drum 413 is a negative charging type organic photoconductor in which an under coat layer (UCL), a charge generation layer (CGL), and a charge transport layer (CTL) are sequentially laminated on a peripheral surface of an aluminum conductive cylindrical body (aluminum tube). The charge generation layer is formed from an organic semiconductor obtained by dispersing a charge generation material (for example, a phthalocyanine pigment) in a resin binder (for example, polycarbonate), and generates a pair of positive charge and negative charge through exposure by the exposure device 411. The charge transport layer is formed from a material obtained by dispersing a hole transporting material (electron supply nitrogen-containing compound) in a resin binder (for example, a polycarbonate resin), and transports a positive charge generated in the charge generation layer to a surface of the charge transport layer.

The controller 100 controls a drive current supplied from a drive motor (not illustrated), which rotates the photoconductor drum 413, to rotate the photoconductor drum 413 at a constant peripheral velocity.

The charging device 414 evenly charges a surface of the photoconductor drum 413 having photoconductivity. For example, the exposure device 411 is constituted by a semiconductor laser, and irradiates the photoconductor drum 413 with laser light corresponding to an image of each color component. When a positive charge is generated in the charge generation layer of the photoconductor drum 413 and is transported to the surface of the charge transport layer, a surface charge (negative charge) of the photoconductor drum 413 is neutralized. An electrostatic latent image of each color component is formed on the surface of the photoconductor drum 413 due to a potential difference from the periphery.

For example, the developing device 412 is a two-component developing type developing device and allows a toner of each color component to adhere to the surface of the photoconductor drum 413 to visualize the electrostatic latent image. According to this, a toner image is formed.

The drum cleaning device 415 includes a drum cleaning blade that comes into sliding contact with the surface of the photoconductor drum 413, and the like, and removes a transfer residual toner that remains on the surface of the photoconductor drum 413 after primary transfer.

The intermediate transfer unit 42 includes the intermediate transfer belt 421 as an image carrier, a primary transfer roller 422, a plurality of support rollers 423, a secondary transfer roller 424, a belt cleaning unit 426, and the like.

The intermediate transfer belt 421 is configured as an endless belt, and is stretched around the plurality of support rollers 423 in a loop shape. At least one of the plurality support rollers 423 is configured as a drive roller, and the others are configured as following rollers. For example, it is preferable that a roller 423A disposed downstream of the primary transfer roller 422 for the K component in a belt travel direction is the drive roller. According to this, it is easy to constantly maintain a belt travel velocity in a primary transfer section. When the drive roller 423A rotates, the intermediate transfer belt 421 travels in a direction of an arrow A at a constant velocity.

The primary transfer roller 422 faces the photoconductor drum 413 of each color component, and is disposed on an inner peripheral surface side of the intermediate transfer belt 421. When the primary transfer roller 422 comes into press-contact with the photoconductor drum 413 with the intermediate transfer belt 421 interposed therebetween, a primary transfer nip for transferring a toner image from the photoconductor drum 413 to the intermediate transfer belt 421 is formed.

The secondary transfer roller 424 faces a backup roller 423B that is disposed downstream of the drive roller 423A in the belt travel direction, and is disposed on an outer peripheral surface side of the intermediate transfer belt 421. When the secondary transfer roller 424 comes into press-contact with the backup roller 423B with the intermediate transfer belt 421 interposed therebetween, a secondary transfer nip for transferring a toner image from the intermediate transfer belt 421 to the sheet S is formed.

When the intermediate transfer belt 421 passes through the primary transfer nip, toner images on the photoconductor drums 413 are sequentially superimposed on the intermediate transfer belt 421 and are primarily transferred thereto. Specifically, when a primary transfer bias is applied to the primary transfer roller 422, and a charge having a polarity opposite that of a toner is applied to a rear surface side (a side that comes into contact with the primary transfer roller 422) of the intermediate transfer belt 421, a toner image is electrostatically transferred to the intermediate transfer belt 421.

Then, when the sheet S passes through the secondary transfer nip, the toner image on the intermediate transfer belt 421 is secondarily transferred to the sheet S. Specifically, when a secondary transfer bias is applied to the secondary transfer roller 424, and a charge having a polarity opposite that of a toner is applied to the rear surface side (side that comes into contact with the secondary transfer roller 424) of the sheet 5, the toner image is electrostatically transferred to the sheet S. The sheet S to which the toner image is transferred is conveyed toward the fixing unit 60.

The belt cleaning unit 426 includes a belt cleaning blade that comes into sliding contact with a surface of the intermediate transfer belt 421, and the lie, and removes a transfer residual toner that remains on the surface of the intermediate transfer belt 421 after secondary transfer. Furthermore, a configuration (so-called belt-type secondary transfer unit) in which a secondary transfer belt is stretched in a loop shape on a plurality of support rollers including the secondary transfer roller may be employed instead of the secondary transfer roller 424.

The fixing unit 60 includes an upper fixing unit 60A including a fixing surface side member that is disposed on a fixing surface (surface on which a toner image is formed) side of the sheet S, a lower fixing unit 60B including a rear surface side support member that is disposed on a rear surface (surface opposite to the fixing surface) side of the sheet S, a heating source 60C, and the like. When the rear surface side support member comes into press-contact with the fixing surface side member, a fixing nip through with the sheet S is conveyed in a manner of being sandwiched.

The fixing unit 60 heats and compresses the conveyed sheet S, to which the toner image is secondarily transferred, in the fixing nip to fix the toner image to the sheet S. The fixing unit 60 is disposed as a unit in a fixing device F. In addition, an air separation unit 60D, which separates the sheet S from the fixing surface side member by spraying air, is disposed in the fixing device F.

The sheet conveying unit 50 includes a sheet feeding unit 51, a sheet ejection unit 52, a conveying path unit 53, and the like. Three sheet feeding tray units 51a to 51c constituting the sheet feeding unit 51 accommodate sheets S (standard sheets or specific sheets), which are identified on the basis of a basis weight, a size, and the like, for each kind that is set in advance. The conveying path unit 53 includes a plurality of pairs of conveying rollers such as a pair of resist rollers 53a.

The sheets S accommodated in the sheet feeding tray units 51a to 51c are sent out one by one from the uppermost portion and is conveyed to the image forming unit 40 by the conveying path unit 53. At this time, an inclination of the sheet S that is fed is corrected and conveying timing is adjusted by a resist roller section in which the pair of resist rollers 53a is provided. In addition, in the image forming unit 40, toner images of the intermediate transfer belt 421 are collectively and secondarily transferred to one surface of the sheet S, and a fixing process in the fixing unit 60 is performed. The sheet S on which an image is formed is ejected to the outside of the apparatus by the sheet ejection unit 52 provided with sheet ejection rollers 52a.

The color sensor 80 is disposed downstream of the fixing unit 60 and upstream of the sheet ejection unit 52, and detects color information of an output image formed on the sheet S. For example, the color sensor 80 according to this embodiment is a filter type color sensor, and includes a plurality of light-emitting elements (for example, an LED array that emits white light) which emit light, a plurality of filters (for example, filters of respective colors of RGB) having different spectral transmission characteristics, and a light-receiving element (for example, a photodiode array) that receives reflected light of through the filters. Furthermore, as the color sensor 80, a spectrophotometry type color sensor and the like may be used.

The color sensor 80 operates on the basis of a control signal of the controller 100, detects color information of an output image formed on the sheet S, and outputs the color information to the controller 100.

For example, the color sensor 80 according to this embodiment detects color information of the output image for every pixel region with respect to the entirety of a region of the output image. Furthermore, a spot size of a pixel region detected by the color sensor 80 according to this embodiment corresponds to a region of one pixel. Furthermore, the spot size of the color sensor 80 is not limited to a region of one pixel, and may have a size corresponding to partition regions (for example, 2×2) formed in a plurality of pixels.

[Calibration Processing]

Hereinafter, description will be given of calibration processing that is performed by the image forming apparatus 1 according to this embodiment with reference to FIGS. 3A to 8B.

Typically, whenever executing a printing job, the image forming apparatus 1 according to this embodiment stores color information (of input image data that is a target of the printing job hereinafter, abbreviated as "color information of input image data"), color information of the output image which is detected by the color sensor 80 after the input image data is printed (hereinafter, abbreviated as "color information of an output image"), image forming conditions of the image forming unit 40 when forming the output image, and the like as data for calibration in the storage unit 72 in correlation with each other.

However, the image forming apparatus 1 according to this embodiment also uses image forming conditions related to color information that is unintentionally generated due to color deviation or toner scattering, and the like as the data for calibration so as to satisfy data for calibration.

—Color Information Detector 101—

The color information detector 101 acquires a detection signal from the color sensor 80, and detects color information of the output image for each pixel region (for example, for each pixel). In addition, the color information detector 101 stores the color information of the output image which is detected and the color information of the input image data in the storage unit 72 in correlation with positions thereof for every pixel region (refer to FIG. 6).

Figure 3A:
FIGS. 3A and 3B are views illustrating a relationship between color information of input image data and color information of an output image according to the first embodiment.
Figure 3B:

FIGS. 3A and 3B are views illustrating a relationship between the color information of the input image data and the color information of the output image.

FIG. 3A is a view illustrating the color information of the input image data, and FIG. 3B is a view illustrating the color information of the output image which is detected in a region corresponding to FIG. 3A. FIG. 3B illustrates a state in which color deviation of a C toner image (region C surrounded by a bold line) of the output image occurs on a left side of one pixel with respect to the input image data in FIG. 3A.

Furthermore, hereinafter, addresses of respective pixel regions in FIGS. 3A and 3B will be described by using addresses given to the horizontal axis (main scanning direction) and the vertical axis (sub-scanning direction in FIGS. 3A and 3B (for example, a pixel region on an upper-left end is referred to as "1 (main scanning direction) and (sub-scanning direction)", and a pixel region on a lower-right end is referred to as "7 (main scanning direction), 4 (sub-scanning direction)"). Each of compartments in FIGS. 3A and 3B corresponds to a region of one pixel, and "M100" (representing a single color of magenta (M) and "C100" (representing a single color of cyan (C) in the compartments are color information for every pixel region which is set to the input image data. In addition, a concentration of each toner image is shown as a numerical value when "100" is set as the maximum value.

The output image in FIG. 3B enters a state in which a color of "M100" and a color of "C100" overlap each other in pixel regions of "2, 2" and "2, 3" in FIG. 3B due to color deviation of the C toner image, and enters a white state in Which a color output of "C100" is not present in pixel regions of "5, 2" and "5, 3".

Since the output image is formed through superimposition of a plurality of toner images (in this embodiment, four colors of YMCK), as in pixel regions of "2, 2" and "2, 3" in FIG. 3B, color deviation or toner scattering may occur in contour regions in which different colors are adjacent to each other. As a result, new color information that is not included in the input image data may generated in the output image. The image forming apparatus 1 according to this embodiment extracts the new color information and uses the new color information as data for calibration.

—Color Coordinate Converter 102—

The color coordinate converter 102 converts color information of the input image data for every pixel region and color information of the output image for every pixel region into indexes (in this embodiment, indexes related to an angle or a distance of an ab-plane of an Lab color coordinate space) which define a color in predetermined color space coordinates.

Furthermore, the color information of the output image is a measurement value that is detected by the color sensor 80. The color coordinate converter 102 performs the above-described conversion processing to calculate a correlation between the color information of the input image data and the color information of the output image.

Figure 4:
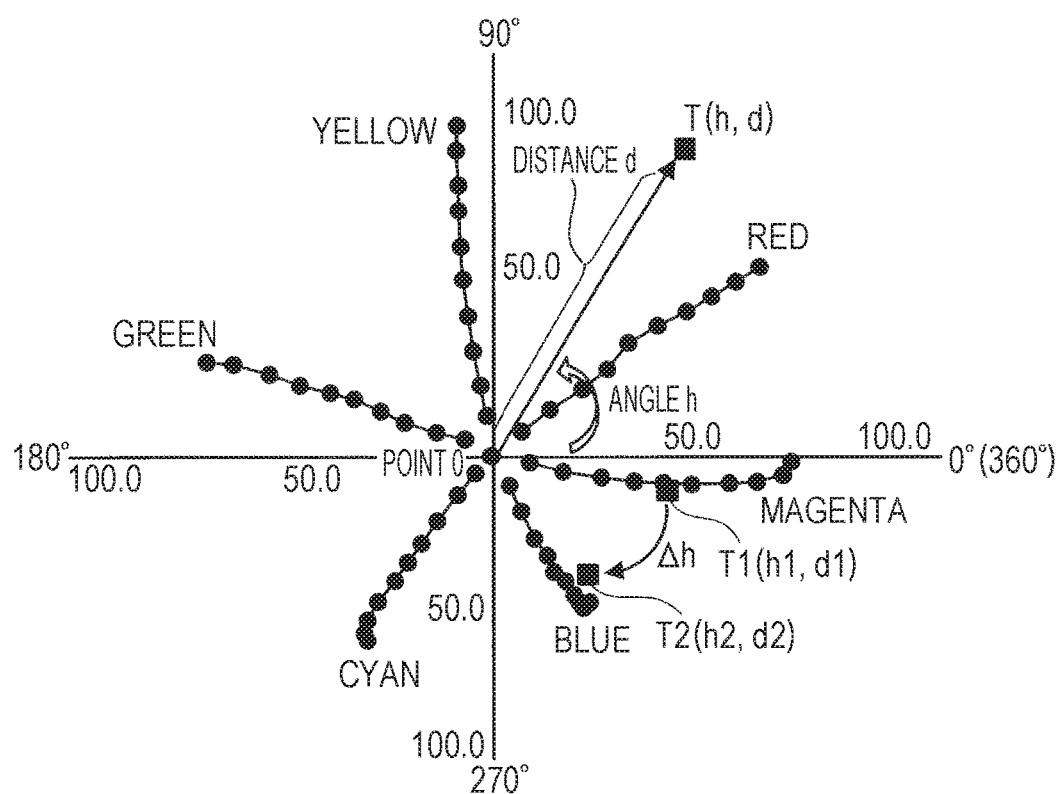
FIG. 4 is a view illustrating an example of indexes which define colors.

FIGS. 4 and 5 are views illustrating an example of the indexes which define colors.

FIGS. 4 and 5 illustrate indexes related to an angle or a distance in an ab-plane of the Lab color coordinate space. Furthermore, in the ab-plane of the Lab color coordinate space, a polar coordinate type angle h corresponds to a color, and a polar coordinate type distance d corresponds to a chroma. In addition, a value of the angle h becomes an index that identifies the degree of color mixing in respective toner images of YMCK, and a value of the distance d becomes an index that identifies a depth of the respective toner images of YMCK.

In FIG. 4, a tine that extends from the center 0-point in a right direction corresponds to a single color of the magenta (M) component, a line that extends from the center 0-point in an upper-left direction corresponds to a single color of the yellow (Y) component, and a line that extends from the center 0-point in a lower-left direction corresponds to a single color of the cyan (C) component. In addition, as correspondence with the RGB components, a line that extends from the center 0-point in a lower-right direction corresponds to a blue (B) component, a line that extends from the center 0-point in an upper-right direction corresponds to a red (R) component, and a line that extends from the center 0-point in an upper-left direction corresponds to a green (G) component.

The color information of each pixel region of the output image (and the input image data) can be expressed by one point on the color coordinate plane in FIG. 4. A point T1 (h1, d1) and a point T2 (h2, d2) in FIG. 4 are values of color information of the pixel region of "2, 2" illustrated in FIGS. 3A and 3B. The point T1 (h1, d1) represents color information of the input image data, and the point T2 (h2, d2) represents color information of the output image.

FIG. 5 illustrates a correlation between the angle h and the distance d in the ab-plane of the Lab color coordinate space, and the YMCK components and the RGB components in a table type.

FIG. 6 is a data table illustrating a correlation between the color information of the input image data and the color information of the output image in FIGS. 3A and 3B.

In FIG. 6, an input data value represents the color information of the input image data, and a measurement value represents the color information of the output image. In addition, Δh in FIG. 6 is a differential value Δh (hereinafter, referred to "angular error Δh (=measurement value h2−input data value h1)") related to the angle h, and represents the degree of color mixing in respective toner images of YMCK in the output image with respect to the input image data.

Furthermore, in this embodiment, as an index indicating a correlation between the color information of the input image data and the color information of the output image, an aspect of using the ab-plane of the Lab color coordinate space is illustrated, but an XV plane and the like of XYZ color coordinates may be used without limitation.

—Unintentional Color Extractor 103—

The unintentional color extractor 103 extracts a pixel region in which the color information of the output image is different from the color information of the input image data for use as data for calibration, and corrects the color information of the input image data on the basis of the color information of the output image with respect to the pixel region that is extracted.

For example, the unintentional color extractor 103 extracts a pixel region in which the color information of the output image is different from the color information of the input image data on the basis of the angular error Δh of the index related to the angle h of the color information of the input image data and the color information of the output image.

In the ab-plane of the Lab color coordinate space, in a case where the angular error Δh is equal to or greater than a predetermined threshold value, new color information is formed due to color deviation or toner scattering, and determination can be made as data useful as data for calibration. Accordingly, for example, the unintentional color extractor 103 extracts a pixel region in which the angular error Δh is equal to or greater than a predetermined threshold value (in FIG. 6, a pixel region of "2, 2" in which the angular error Δh is as great as −58.3).

On the other hand, in the ab-plane of the Lab color coordinate space, even in a case where the angular error Δh is great, if the distance d2 is small, a corresponding pixel region (for example, a pixel region of "5, 2") enters a state that is close to white, and is not necessary as data for calibration. According to this, the unintentional color extractor 103 according to this embodiment does not extract a pixel region in which the distance d2 is small as a correction target.

Furthermore, from the viewpoint of reducing processing load, a target region, for which the unintentional color extractor 103 according to this embodiment compares the color information of the input image data and the color information of the output image with each other, is set to only contour regions (in FIGS. 3A and 3B, pixel regions of "2, 2" and "3, 2" and pixel regions of "2, 3" and "3, 3" correspond to the contour regions) in which color information is different between adjacent pixel regions in the input image data in which color deviation or toner scattering may occur. For example, the comparing target region is set to a region that is spaced away from a boundary position, at which the color information is different between adjacent pixel regions of the contour regions, to a position on the other side by a predetermined number of pixel regions (however, an image region having a size equal to or greater than a spot size detected by the color information detector).

Figures 7, 8A, 8B:
FIG. 7 is a view illustrating an example of a relationship between a symbol of an angular error Δh and a correction target color of the color information of the input image data.
FIGS. 8A and 8B are views illustrating the color information of the input image data before correction and the color information of the input image data after correction according to the first embodiment.

FIG. 7 is a view illustrating an example of a relationship between a symbol of the angular error Δh and a correction target color of color information of the input image data.

FIG. 7 illustrates the following configuration. Specifically, when an input data value of a pixel region is the yellow (Y) component, in a case where the angular error Δh is a positive value, the cyan (C) component is corrected, and in a case where the angular error Δh is a negative value, the magenta (M) component is corrected. In addition, similarly, when the input data value of the pixel region is the magenta (M) component, in a case where the angular error Δh is a positive value, the yellow (Y) component is corrected, and in a case where the angular error Δh is a negative value, the cyan (C) component is corrected. In addition, similarly, when the input data value of the pixel region is the cyan (C) component, in a case where the angular error Δh is a positive value, the magenta (M) component is corrected, and in a case where the angular error Δh is a negative value, the yellow (Y) component is corrected.

FIG. 7 illustrates the following state. Specifically, with respect to the pixel region "2, 2" in FIGS. 3A and 3B, when the color information of the input image data is M100 (M: 100%), the angular error Δh is in a negative direction (refer to FIG. 6), and thus the color information of the output image is in a state in which cyan (C) is mixed with magenta (M).

Accordingly, with respect to the pixel region of "2, 2" of the input image data, the unintentional color extractor 103 increments cyan (C) to correct color information (point T1 in FIG. 4) of the input image data to a value that matches color information (point T2 in FIG. 4) of the output image.

For example, a C component [%] of the output image of the pixel region of "2, 2" in FIGS. 3A and 3B can be calculated as in the following Expression (1).

$$\text{Expression (1)}$$

C component [%] of output image = 100% ×

(angle $h2$ of output image − reference value $h$ of $M$ component)/

(reference value $h$ of $B$ component − reference value $h$ of $M$ component) =

$100\% \times (300.6 - 358.9)/(300 - 358.9) = 99.0\%$

Here, as the reference value h of the M component and the reference value h of the B component, values in FIG. 5 are referenced. In the computing processing, a ratio of the C component that is included at the point T2 in FIG. 4 is calculated from the angle h2 of the output image (for example, when the M component is 100% and the C component is 100%, the color information point T2 of the output image is present on a straight line of the B component).

The color information of the output image in the pixel region of "2, 2" can be expressed as Y:0, M:100, C:99, K:0 (in the input image data, Y:0, M:100, C:0, K:0) in terms of angular components of YMCK in the image forming unit 40. The unintentional color extractor 103 corrects the color information of the input image data to match the color information of the output image which is calculated in this manner.

Furthermore, the computing processing of Expression (1) is an example of color conversion processing of the color information of the output image into respective components (YMCK components) of a plurality of toner images, and other computing methods may be used. As a computing expression at this time, an expression corresponding to the angle h1 of the color information in the input image data and a mixed color Δh is used.

FIGS. 8A and 8B are views illustrating color information of the input image data before correction (FIG. 8A) and color information of the input image data after correction (FIG. 8B).

Furthermore, as illustrated in FIGS. 8A and 8B, the unintentional color extractor 103 does not perform correction of color information of the input image data with respect to a pixel region other than the pixel region "2, 2" in a second column of sub-scanning in FIGS. 3A and 3B.

—Calibration Processor 104—

The calibration processor 104 stores the color information of the input image data after correction by the unintentional color extractor 103 in the storage unit 72 as data for calibration in combination with the color information of the output image and image forming conditions when forming the output image.

Furthermore, the calibration processor 104 stores the data for calibration, for example, in a standard type of an ICC profile.

The calibration processor 104 updates color correction data (for example, a gamma correction curve), which is referenced by the image processor 30, by using the data for calibration which is accumulated as described above whenever executing printing or periodically. According to this, in a case where a printing command is issued from an external computer and the like, the image forming apparatus 1 (image processor 30) can perform correction processing with respect to the input image data by using the color correction data after updating to form an image.

However, a target for which the calibration processor 104 performs calibration is not limited to the color correction data, and may be device data when setting image forming conditions (for example, a charging potential of the charging device 414, a developing potential of the developing device 412, the amount of exposure in the exposure device 411, and the like) of the image forming unit 40.

Furthermore, the updating processing using the data for calibration is performed by a known method, and thus description thereof will be omitted (for example, refer to JP 2008-224845 A and JP 11-075067 A).

[Operation Flow of Image Forming Apparatus]

Figure 9A:
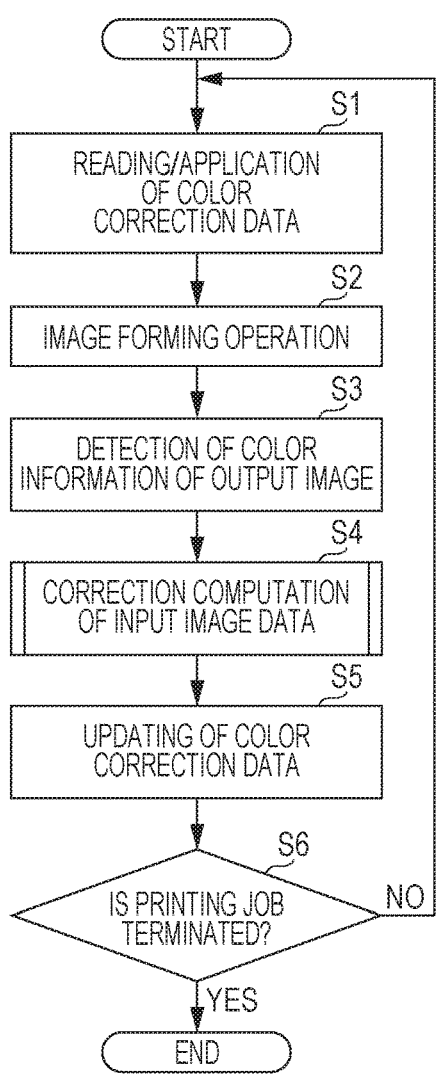
FIGS. 9A and 9B are flowcharts illustrating an example of an operation of the image forming apparatus according to the first embodiment.
Figure 9B:
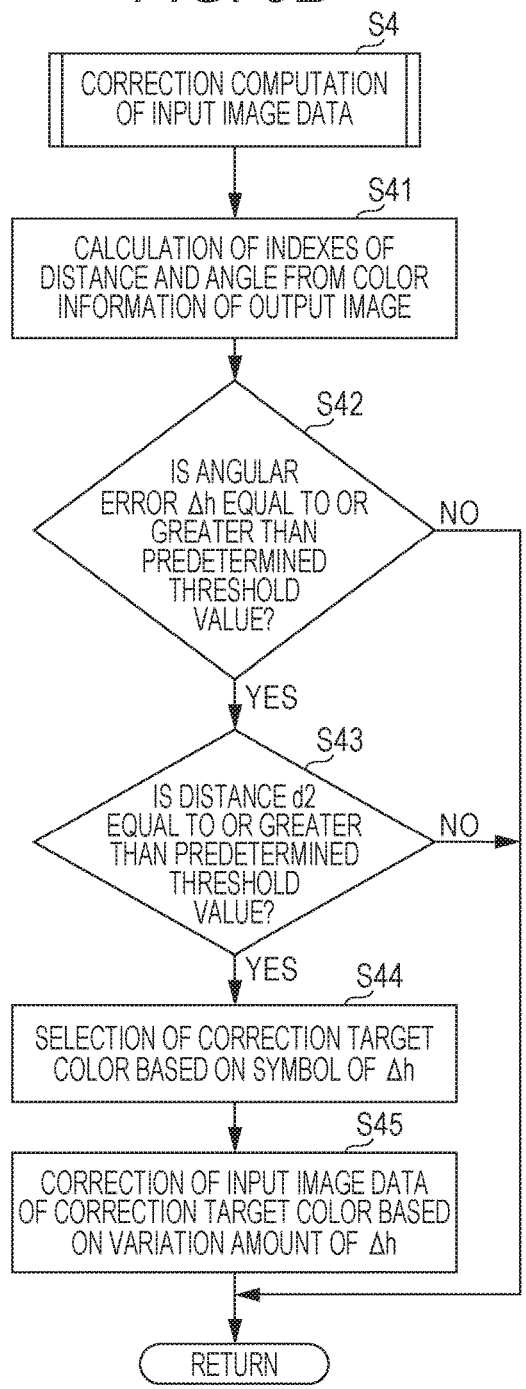

FIGS. 9A and 9B are flowcharts illustrating an example of an operation of the image forming apparatus 1 according to this embodiment. The flowcharts correspond to processing that is sequentially executed by the controller 100 when receiving a printing command in accordance with a computer program. Furthermore, FIG. 9A is a main flow, and FIG. 9B is a sub-flow of FIG. 9A.

In step S1, the controller 100 reads color correction data (LUT) stored in the storage unit 72 and applies color correction with respect to input image data.

In step S2, the controller 100 allows the image forming unit 40 to execute an image forming operation on the basis of the input image data for which color correction has been performed. According to this, the image forming unit 40 performs image formation corresponding to the input image data for which color correction has been performed with respect to the sheet S.

In step S3, the controller 100 (color information detector 101) allows the color sensor 80 to execute detection of color information of the output image.

In step S4, the controller 100 (unintentional color extractor 103) compares the color information of the input image data and the color information of the output image with each other to acquire data for calibration, and performs a correction computation of the input image data. In step S4, processing (S41 to S45) of the sub-flow illustrated in. FIG. 9B is performed.

In step S41, the controller 100 (color coordinate converter 102) calculates an index of the angle h2 and the distance d2 from the color information of the output image for every pixel region, and calculates an index of the angle h1 and the distance d1 of the color information of the input image data.

In step S42, the controller 100 (unintentional color extractor 103) calculates the angular error Δh that is a differential value between a measurement value and an input data value for every pixel region, and determines whether or not the angular error Δh is equal to or greater than a predetermined threshold value. In a case where the angular error Δh is equal to or greater than the predetermined threshold value (step S42: YES), the subsequent determination processing in step S43 is executed. On the other hand, in a case where the angular error Δh is less than the predetermined threshold value (step S42: NO), it can be determined that newly generated color information does not exist, and thus the series of flows in step S4 are terminated and the processing returns to the main flow.

In step S43, with respect to the pixel region that is extracted in step S42, the controller 100 (unintentional color extractor 103) determines whether or not the distance d2 in the color information of the output image is equal to or greater than a predetermined threshold value. In a case where the distance d2 in the color information of the output image is equal to or greater than the predetermined threshold value (step S43: YES), the subsequent correction processing in step S44 is executed. On the other hand, in a case where the distance d2 of the color information of the output image is less than the predetermined threshold value (step S43: NO), it can be determined that the newly generated color information is not useful (for example, closes to white), and thus the series of flows in step S4 are terminated and the processing returns to the main flow.

In step S44, as illustrated in FIG. 7, the controller 100 (unintentional color extractor 103) determines a correction target color from the angle hi of the input image data and the symbol of the angular error Δh.

In step S45, the controller 100 (unintentional color extractor 103) performs correction of the color information of the input image data from a value of the angular error Δh by using the following Expression (1) and the like, and stores the color information in the storage unit 72 as data for calibration. In addition, after executing the processing, the processing returns to the main flow.

In step S5, the controller 100 (calibration processor 104) updates the color correction data (LUT) on the basis of the stored data for calibration.

In step S6, in a case where a printing job is terminated (step S6: YES), the controller 100 terminates the series of flows. On the other hand, in a case where the printing job is not terminated (step S6: NO), the controller 100 returns to step S1 and continues the processing.

According to the image forming apparatus 1 according to this embodiment, color information that is newly and unintentionally generated in an output image due to color deviation or toner scattering is extracted, and image forming conditions when the new color information is generated, and the like can be used as data for calibration. According to this, it is possible to acquire data for calibration of a plurality of pieces of color information without executing test printing, and it is possible to perform calibration with accuracy.

In addition, it is possible to prevent erroneous color information, in which a fluctuation occurs due to the color deviation or the toner scattering, from being used as the data for calibration, and thus, in this regard, it is possible to perform calibration with more accuracy.

Second Embodiment

Next, an image forming apparatus 1 according to a second embodiment will be described with reference to FIGS. 10A to 14.

The image forming apparatus 1 according to this embodiment is different form the first embodiment in that when the unintentional color extractor 103 corrects color information of a pixel region in which input image data is present, the correction is also performed with respect to a pixel region on the other side of the contour regions in addition to the pixel region. Furthermore, description of a configuration that is common to the first embodiment will be omitted (hereinafter, this is also true of other embodiments).

Typically, a color variation caused by the color deviation or the toner scattering occurs not only in one pixel region but also in an adjacent pixel region. From this viewpoint, when performing correction of the color information with respect to a predetermined pixel region in the input image data, the image forming apparatus 1 according to this embodiment also performs correction of color information with respect to a pixel region, which is adjacent to the predetermined pixel region, on the other side of the contour regions.

Figure 10A:
FIGS. 10A and 10B are views illustrating a relationship between color information of an input image data and color information of an output image according to a second embodiment.
Figure 10B:

FIGS. 10A and 10B are views illustrating a relationship between color information of input image data (FIG. 10A) and color information of an output image (FIG. 10B) in this embodiment. FIG. 10B illustrates a state in which color deviation occurs in a C toner image (region C surrounded by a bold line) from pixel regions of "4, 1" to "4, 4" toward pixel regions of "3, 1" to "3, 4".

FIG. 11 is a data table illustrating a correlation between the color information of the input image data and the color information of the output image in FIGS. 10A and 10B.

Figures 12, 13A, 13B:
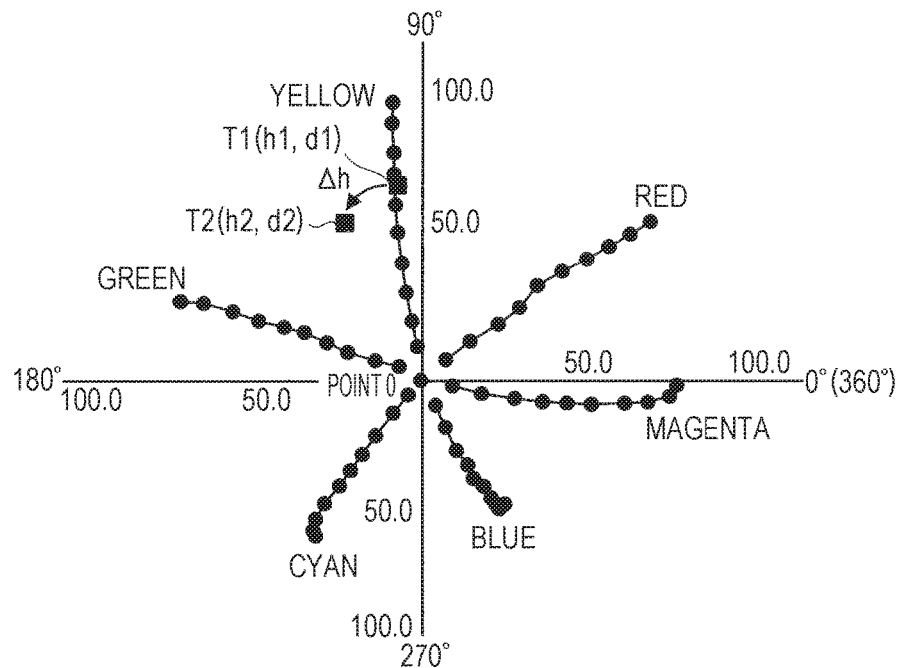
FIG. 12 is a view illustrating a correlation between the color information of the input image data and the color information of the output image on an ab-plane of an Lab color coordinate space according to the second embodiment.
FIGS. 13A and 13B are views illustrating the color information of the input image data before correction and the color information of the input image data after correction according to the second embodiment.

FIG. 12 is a view illustrating a correlation between color information (point T1) of the input image data and color information (point T2) of the output image in the pixel region of "3, 2" in FIGS. 10A and 10B on an ab-plane of an Lab color coordinate space.

As illustrated in FIGS. 11 and 12, the angular error Δh becomes as large as +13.5 in the pixel region of "3, 2" due to color deviation of the C toner image. Accordingly, the unintentional color extractor 103 according to this embodiment corrects the color information of the input image data of the pixel region of "3, 2" through the same computing processing as in the first embodiment.

Here, since the input image data is Y100 (Y: 100%), deviation of the angular error Δh to a positive direction represents a state in which the color information of the output image is close to a green (G) component direction, and cyan (C) is mixed in yellow (Y) (refer to FIG. 12).

For example, a C component [%] of the output image can be calculated by using the following Expression (2).

$$\begin{aligned}
&C \text{ component [\%] of output image} = \\
&\quad 100\% \times (\text{angle } h2 \text{ of output image} - \text{reference value of } Y \text{ component}) / \\
&\quad (\text{reference value of } G \text{ component} - \\
&\quad \text{reference value of } Y \text{ component}) = \\
&\quad 100\% \times (108.8 - 95.3)/(159.2 - 95.3) = 21.0\%
\end{aligned}$$

Expression (2)

Accordingly, the color information of the output image in the pixel region of "3, 2" can be expressed as Y:100, M:0, C:21, K:0 (in the input image data, Y:100, M:0, C:0, K:0) in a color coordinate space of YMCK. The unintentional color extractor 103 corrects the color information of the input image data to match the color information of the output image which is calculated in this manner.

On the other hand, as illustrated in FIG. 11, in a pixel region of "4, 2" that is in contact the pixel region "3, 2" on the other side of the contour regions, the angular error Δh is as small as +0.4. However, in a case where color deviation or toner scattering occurs in the pixel region of "3, 2", as described above, it can be determined that a color variation may occur in the pixel region of "4, 2", which is in contact with the pixel region of "3, 2" on the other side of the contour regions, due to an influence of the color deviation or the toner scattering.

Accordingly, the unintentional color extractor 103 according to this embodiment performs correction of the color information of the input image data with respect to not only the pixel region of "3, 2" but also the pixel region of "4, 2" that is in contact with the pixel region of "3, 2" on the other side of the contour regions.

When correcting the color information of the pixel region of "4, 2", the unintentional color extractor 103 regards that a color toner is scattered to the pixel region of "3, 2", and performs addition or subtraction by a color variation of the color information of the pixel region of "3, 2" with respect to the color information of the pixel region of "4, 2". Specifically, the unintentional color extractor 103 subtracts C:21 that is increased in the pixel region of "3, 2" from the color information of the pixel region of "4, 2".

FIGS. 13A and 13B are views of the color information of the input image data before correction (FIG. 13A) and the color information of the input image data after correction (FIG. 13B).

The calibration processor 104 stores the color information (FIG. 13B) of the input image data after correction which is generated as described above in the storage unit 72 as data for calibration in combination with the color information of the output image and image forming conditions when forming the output image.

Figure 14:
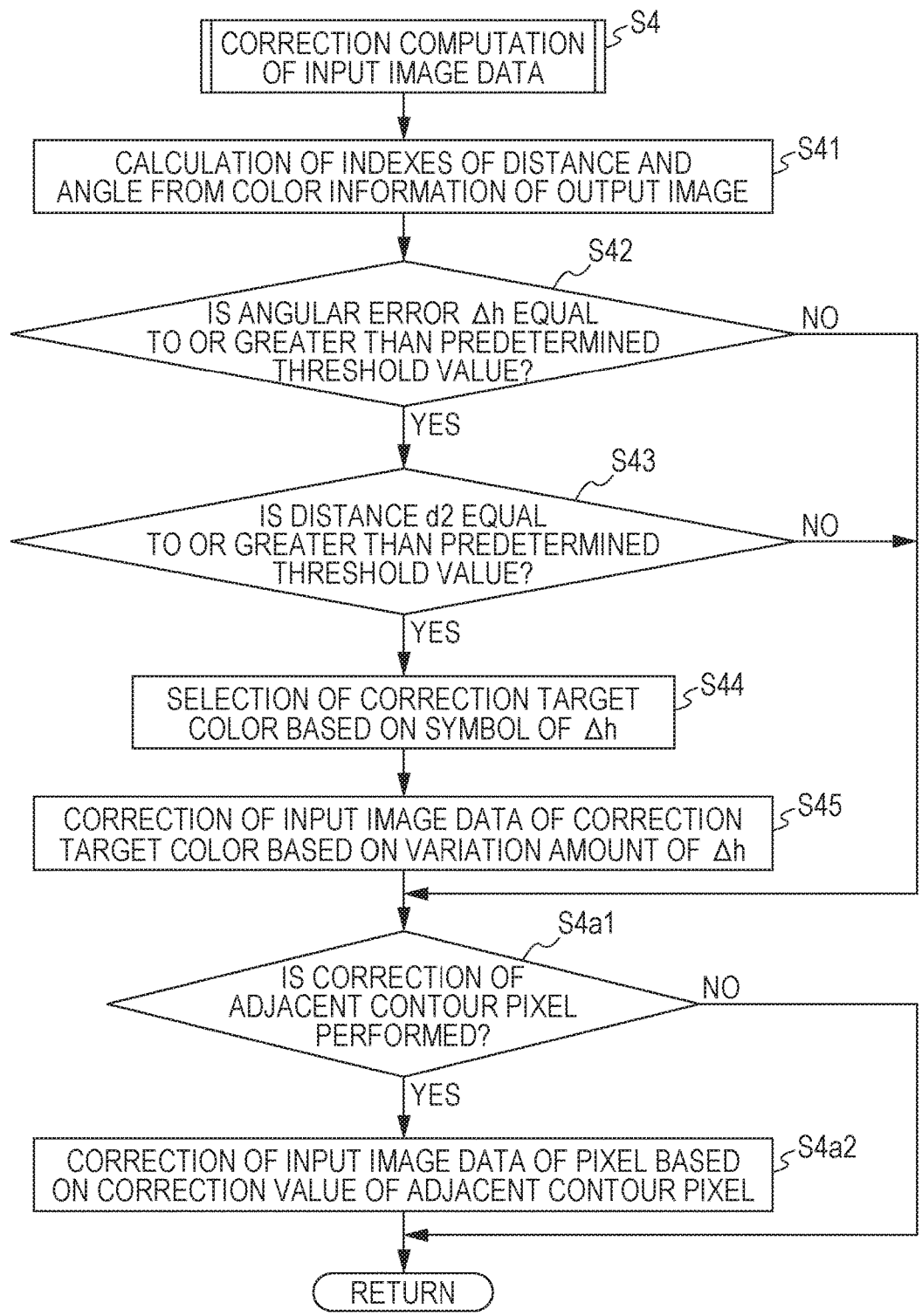
FIG. 14 is a flowchart illustrating an example of an operation of an image forming apparatus according to the second embodiment.

FIG. 14 is a flowchart illustrating an example of an operation of the image forming apparatus 1 according to this embodiment.

FIG. 14 corresponds to the correction computation processing of the input image data in FIG. 9B, and is different from the flowchart in FIG. 9B only in that processing in step S4a1 and processing in step S4a2 are added. Furthermore, description of steps S41 to S45 will be omitted.

In step S4a1, the controller 100 (unintentional color extractor 103) determines whether or not one side of the contour regions is extracted as a correction target. Here, in step S45, in a case where the one side of the contour regions is not extracted as the correction target (step S4a1: NO), the controller 100 (unintentional color extractor 103) does not perform processing, and terminates of a series of processing. On the other hand, in a case where the one side of the contour regions is extracted as the correction target (step S4a1: YES), the controller 100 (unintentional color extractor 103) extracts the other side of the contour regions as the correction target, and performs processing in step S4a2.

Furthermore, in FIGS. 10A and 10B, pixel regions of "3, 1" and "4, 1", pixel regions of "3, 2" and "4, 2", pixel regions of "3, 3" and "4, 3", pixel regions of "3, 4" and "4, 4", and the like correspond to the contour regions.

In step S4a2, as described above, the unintentional color extractor 103 regards that in the pixel region on the other side of the contour regions, a color toner is scattered to a pixel region on one side of the contour regions, and performs addition or subtraction by a color variation of the color information of the pixel region on the one side with respect to the color information of the pixel region on the other side.

According to the image forming apparatus 1 according to this embodiment; with respect to a pixel region that is extracted due to occurrence of color deviation or toner scattering, color information of pixel region on the other side of the contour regions can also be used as data for calibration. According to this, it is possible to acquire data for calibration of a plurality of pieces of color information without executing test printing, and it is possible to perform calibration with accuracy.

In addition, it is possible to prevent erroneous color information, in which a fluctuation occurs due to the color deviation or the toner scattering, from being used as the data for calibration, and thus, in this regard, it is possible to perform calibration with more accuracy.

Third Embodiment

Next, an image forming apparatus 1 according to a third embodiment will be described with reference to FIGS. 15 to 18.

This embodiment is different from the first embodiment in that when performing correction of color information of input image data, the unintentional color extractor 103 adjusts the amount of correction when performing correction on the basis of color information of an output image in non-contour regions.

Occurrence of a color variation in an output image may be caused by a state variation (also referred to as "engine performance") of the image forming unit 40 without limitation to the color deviation or the toner scattering. From this viewpoint, the image forming apparatus 1 according to this embodiment detects the state variation of the image forming unit 40 on the basis of a variation of color information of an output image with respect to color information of input image data in non-contour regions in which color information is the same between adjacent pixel regions in the input image data.

The state variation of the respective image firming units 41Y, 41M, 41C, and 41K of the image forming unit 40 can be detected by a differential value Δd (hereinafter, referred to as "distance error Δd (=measurement value d2−input data value d1)") relating to a distance u of the color information of the input image data and the color information of the output image in the Lab color space coordinate.

Hereinafter, description will be given of a case where color deviation in FIGS. 10A and 10B described in the second embodiment occurs.

FIG. 15 is a data table illustrating a correlation between the color information of the input image data and the color information of the output image in FIGS. 10A and 10B.

Furthermore, in FIG. 15, pixel regions of "3, 2" and "4, 2" correspond to contour regions in which Y100 and C100 are adjacent to each other, pixel regions of "1, 2" and "2, 2" correspond to non-contour regions in which different colors are not adjacent to each other, and pixel regions of "5, 2", "6, 2" and "7, 2" correspond to non-contour regions.

When detecting the state of the image forming unit 41Y, for example, a distance error Δd of the pixel region "1, 2" of Y single color non-contour regions is used. In addition, a concentration variation rate of the Y component of the image forming unit 41Y can be calculated, for example, as in the following Expression (3).

$$\text{Concentration variation rate of } Y \text{ component} = \quad \text{Expression (3)}$$
$$1 + \Delta d / d = 1 - 12.3 / 98.9 = 0.88$$

Figures 16, 17A, 17B:
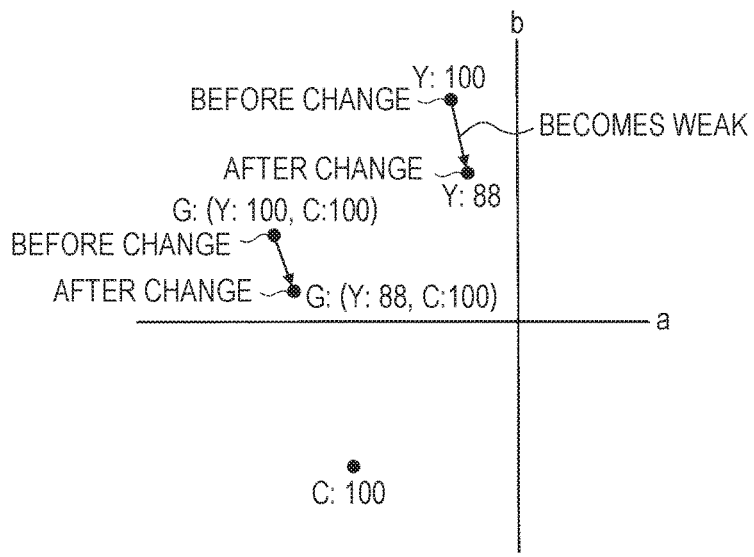
FIG. 16 is a view illustrating processing of changing a reference value of a Y component and a reference value of a G component according to the third embodiment.
FIGS. 17A and 17B are views illustrating the color information of the input image data before correction and the color information of the input image data after correction according to the third embodiment.

FIG. 16 is a view illustrating processing of changing a reference value of the Y component and a reference value of the G component in a case where a variation occurs in the concentration of the Y component of the image forming unit 41Y.

As illustrated in FIG. 16, in a case where the concentration (Y component: 88%) of the Y component in the image forming unit 41Y is weak, correction of the color information of the input image data is performed in consideration of the variation. Accordingly, for example, with respect to the reference value of the green (G) component that is constituted by mixing the yellow (Y) component and the cyan (C) component, the unintentional color extractor 103 makes a change as in the following Expression (4).

$$\text{Expression (4)}$$
$$G \text{ reference value (after change)} =$$
$$(C \text{ reference value} - G \text{ reference value (before change)}) \times$$
$$(1 - \text{variation rate}) + G \text{ reference value (before change)} =$$
$$(239.1 - 159.2) \times (1 - 0.88) + 159.2 = 168.8$$

The unintentional color extractor 103 performs correction of the input image data by using the reference value after the change processing. Accordingly, as is the case with the second embodiment, in this embodiment, when reflecting the color information of the C component of the output image on the color information of the input image data, as in Expression (2), the unintentional color extractor 103 calculates the C component [%] of the output image as in the following Expression (5).

$$\text{Expression (5)}$$
$$C \text{ component of output image [\%]} =$$
$$100\% \times (\text{angle } h2 \text{ of output image} - \text{reference value of } Y \text{ component}) /$$
$$(\text{reference value of } G \text{ component} -$$
$$\text{reference value of } Y \text{ component}) =$$
$$100\% \times (108.8 - 95.3) / (68.8 - 95.3) = 18.0\%$$

Accordingly, the color information of the output image in the pixel region of "3, 2" can be expressed as Y:100, M:0, C:18, K:0 (in the input image data, Y:100, M:0, C:0, K:0) in the color coordinate space of YMCK. The unintentional color extractor 103 corrects the color information of the input image data to match the color information of the output image which is calculated in this manner.

FIGS. 17A and 17B illustrate color information of the input image data before correction (FIG. 17A) and color information of the input image data after correction (FIG. 17B).

Figure 18:
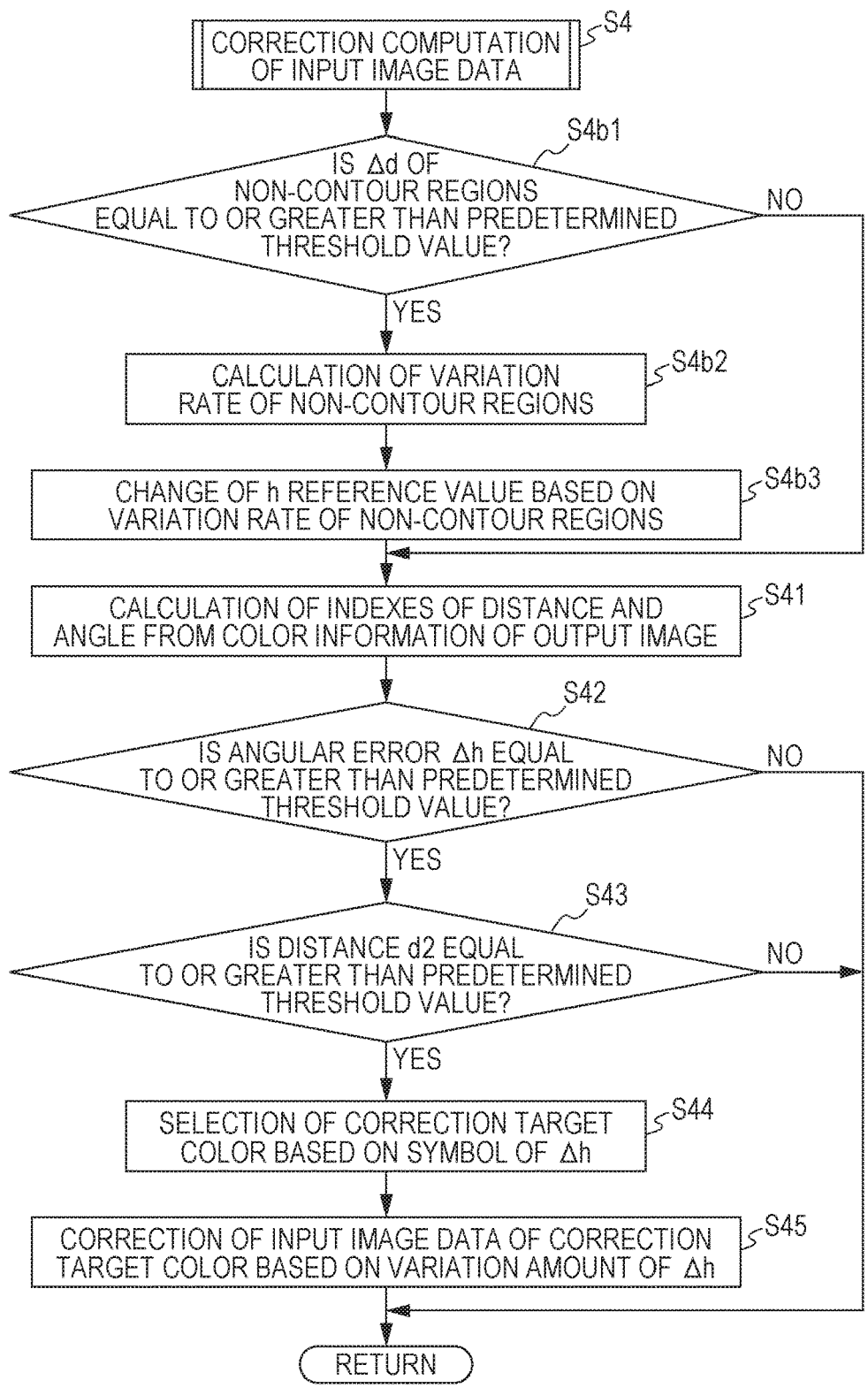
FIG. 18 is a flowchart illustrating an example of an operation of an image forming apparatus according to the third embodiment.

FIG. 18 is a flowchart illustrating an example of an operation of the image forming apparatus 1 according to this embodiment.

FIG. 18 corresponds to the correction computation processing of the input image data in FIG. 9B, and is different from the flowchart in FIG. 9B only in that processing in steps S4$b$1, processing in step S4$b$2, processing in step S4$b$3, and processing in S4$b$4 are added.

In step S4$b$1, the controller 100 (unintentional color extractor 103) determines whether or not the distance error Δd in a pixel region of non-contour regions is equal to or greater than a predetermined threshold value. In addition, in a case where the distance error Δd is equal to or greater than the predetermined threshold value (step S4$b$1: YES), the controller 100 (unintentional color extractor 103) proceeds the processing to step S4$b$2. On the other hand, in a case where the distance error Δd is less than the predetermined threshold value (step S4$b$1: NO), it can be determined that the concentration variation of the image forming unit 41 does not occur, and thus the controller 100 (unintentional color extractor 103) proceeds the processing to step S41.

In step S4$b$2, the controller 100 (unintentional color extractor 103) calculates a concentration variation rate of a color component (any one of YMCK), in which a concentration variation occurs, as in Expression (4).

In step S4$b$3, the controller 100 (unintentional color extractor 103) changes a h reference value of color components such as RGB by using the concentration variation rate calculated in step S4$b$2 as in Expression (5).

Subsequently to step S4$b$3, the controller 100 (unintentional color extractor 103) executes processing in steps S41 to S45 in the same manner as described with reference to FIG. 9B. According to this, it is possible to execute correction of the color information of the input image data with more accuracy.

According to the image forming apparatus 1 according to this embodiment, correction can be made with respect to color information of a pixel region, which is extracted due to occurrence of the color deviation or the toner scattering, in the input image data with more accuracy, and the color information can be used as data for calibration. According to this, it is possible to acquire data for calibration of a plurality of pieces of color information without executing test printing, and it is possible to perform calibration with accuracy.

Fourth Embodiment

Next, an image forming apparatus 1 according to a fourth embodiment will be described with reference to FIGS. 19 and 20.

The image forming apparatus 1 according to this embodiment is different from the image forming apparatus 1 according to the first embodiment in that color deviation or toner scattering is intentionally caused to occur when forming an image of input image data.

Figure 19:
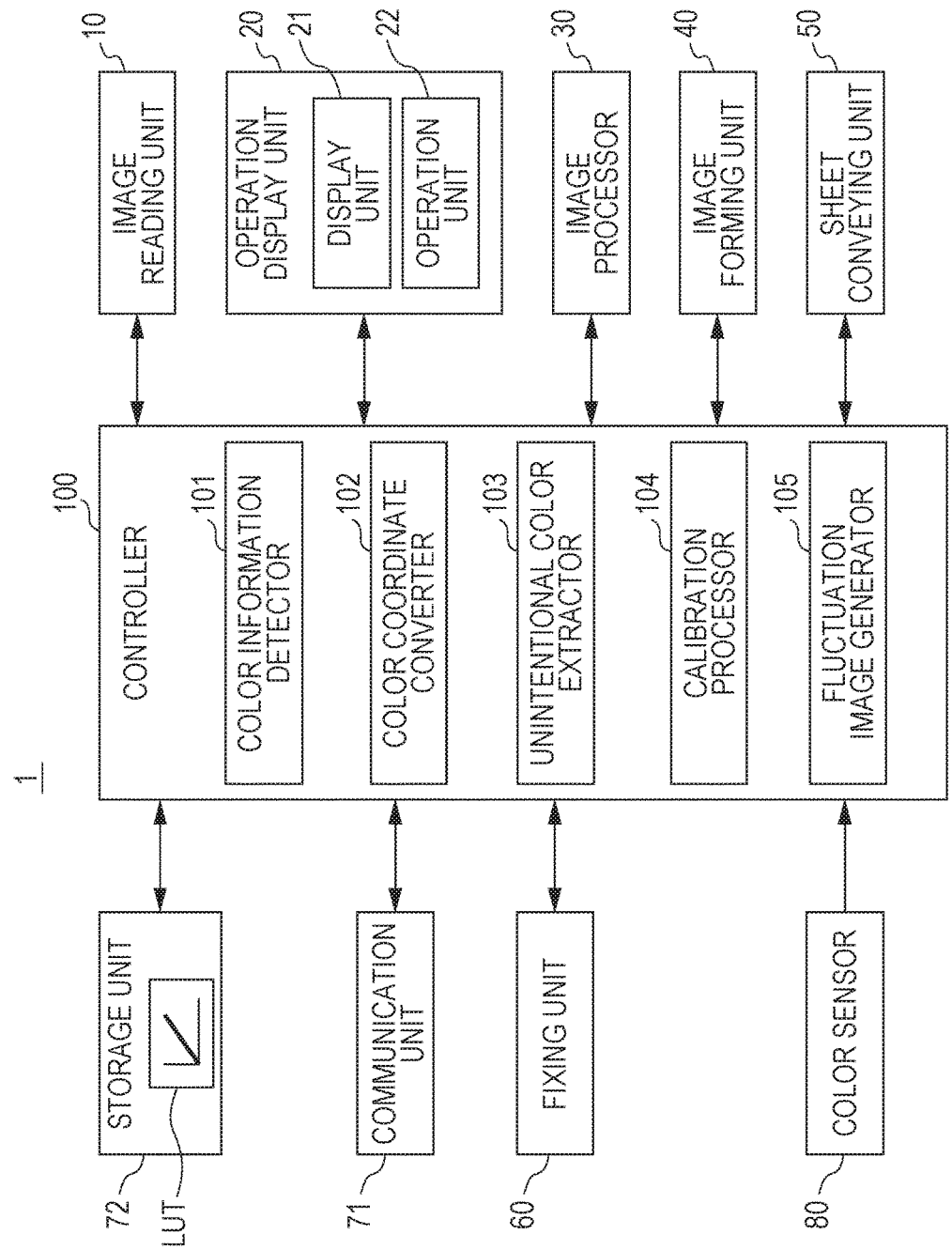
FIG. 19 is a view schematically illustrating an overall configuration of an image forming apparatus according to a fourth embodiment.

FIG. 19 is a view schematically illustrating an overall configuration of the image forming apparatus 1 according to this embodiment. A controller 100 according to this embodiment includes a fluctuation image generator 105 that fluctuates color information of at least one pixel region in input image data and forms an output image in addition to the above-described functions so as to realize the processing.

For example, with respect to color information of contour regions in the input image data, the fluctuation image generator 105 changes a concentration value of a specific color (for example, the C component). In addition, for example, with respect to the color information of the contour regions in the input image data, the fluctuation image generator shifts a writing position of a specific color (for example, the C component) by one pixel region.

According to this, in a pixel region for which the fluctuation processing is performed by the fluctuation image generator 105, new color information, which is not included in the input image data, is generated. In addition, when the new color information is extracted by the unintentional color extractor 103, it is possible to acquire data for calibration of a plurality of pieces of color information without executing test printing.

Figure 20:
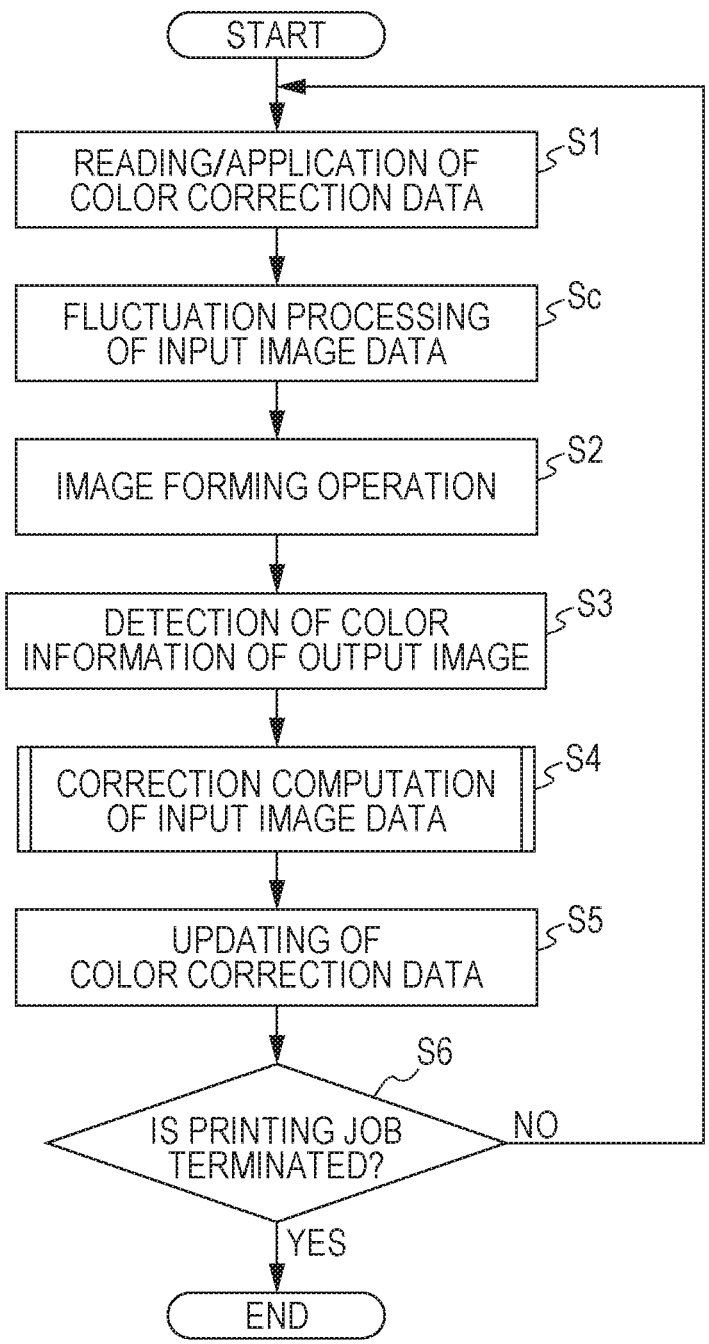
FIG. 20 is a flowchart illustrating an example of an operation of the image forming apparatus according to the fourth embodiment.

FIG. 20 is a flowchart illustrating an example of an operation of the image forming apparatus 1 according to this embodiment.

FIG. 20 corresponds to the flowchart in FIG. 9A and is different from the flowchart in FIG. 9A only in that processing in step Sc is added before executing the image forming operation in step S2. In addition, the controller 100 (fluctuation image generator 105) executes fluctuation processing the input image data in step Sc.

As described above, according to the image forming apparatus 1 according to this embodiment, it is possible to acquire data for calibration of a plurality of pieces of color information without executing test printing.

Fifth Embodiment

Next, an image forming apparatus 1 according to a fifth embodiment will be described with reference to FIGS. 21 and 22.

The image forming apparatus 1 according to this embodiment is different from the image forming apparatus 1 according to the first embodiment in that image forming conditions are intentionally fluctuated when forming an image of the input image data.

Figure 21:
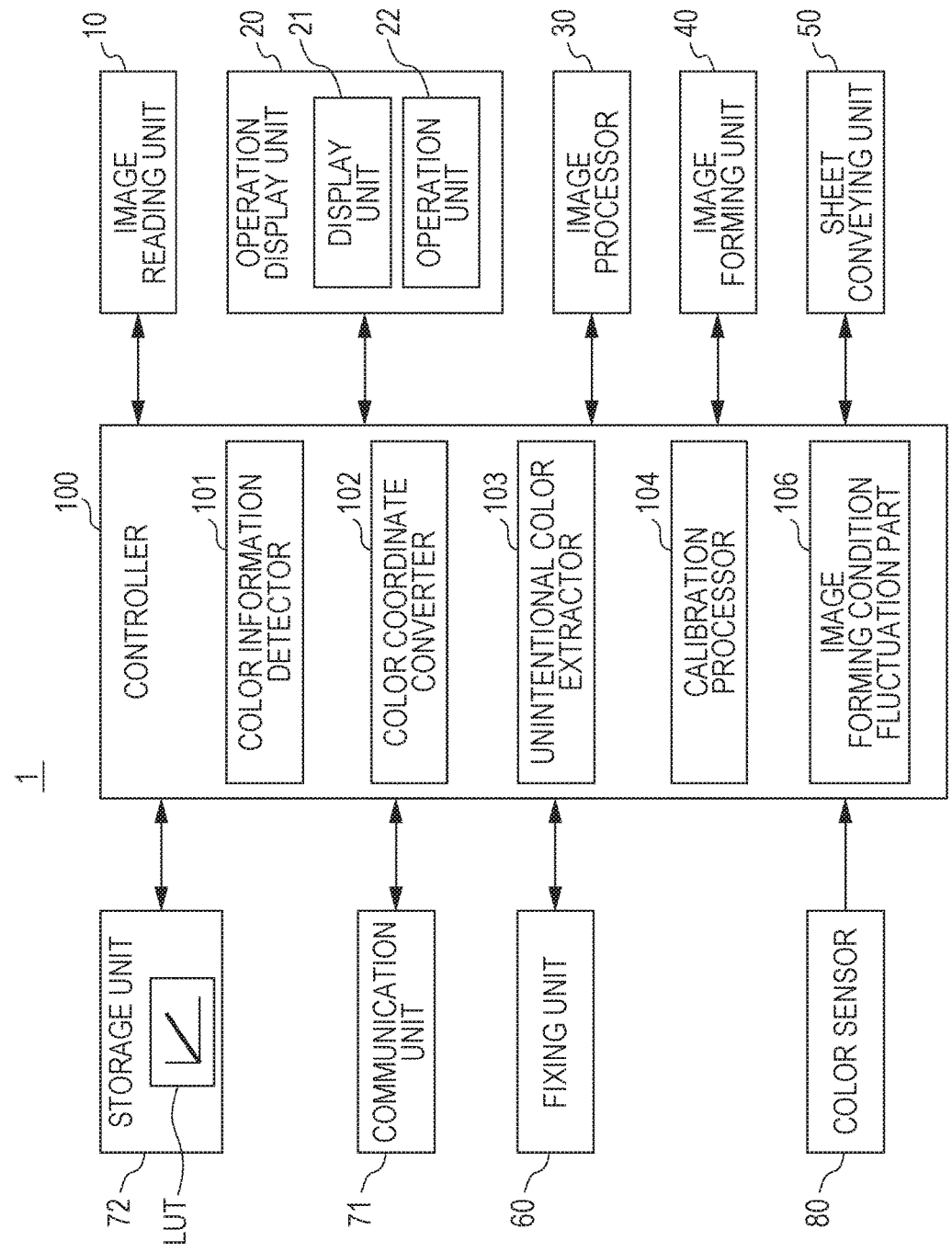
FIG. 21 is a view schematically illustrating an overall configuration an image forming apparatus according to a fifth embodiment.

FIG. 21 is a view schematically illustrating an overall configuration of the image forming apparatus 1 according to this embodiment. A controller 100 according to this embodiment includes an image forming condition fluctuation part 106 that fluctuates predetermined image forming conditions to form the output image corresponding to the input image data in addition to the above-described functions so as to realize the processing.

For example, the image forming condition fluctuation part 106 changes conditions such as the charging potential of the charging device 414, the developing potential of the developing device 412, and the amount of exposure in the exposure device 411 among output image forming conditions. According to this, new color information, which is not included in the input image data, is easily generated. In addition, when the new color information is extracted by the unintentional color extractor 103, it is possible to acquire data for calibration of a plurality of pieces of color information without executing test printing.

FIG. 22 is a flowchart illustrating an example of an operation of the image forming apparatus 1 according to this embodiment.

FIG. 22 corresponds to the flowchart in FIG. 9A and is different from the flowchart in FIG. 9A only in that processing in step Sd is added before executing the image forming operation in step S2. In addition, the controller 100 (image forming condition fluctuation part 106) executes fluctuation processing of image forming conditions when forming the input image data in step Sd.

As described above, according to the image forming apparatus 1 according to this embodiment, it is possible to acquire data for calibration of a plurality of pieces of color information without executing test printing.

Other Embodiments

The invention is not limited to the above-described embodiment, and various modifications can be considered.

In the above-described embodiments, an example of the configuration of the image forming apparatus 1 has been described in various manners. However, the aspects described in the above-described embodiments can be used in combination with each other.

In addition, in the above-described embodiments, as an example of the operation of the image forming apparatus 1, description has been given of a case where the detection operation of the color information detector 101, the computation operation of the color coordinate converter 102, the extraction operation of the unintentional color extractor 103, and the like are executed in a series of flows. However, a part or the entirety of the processing may be executed in parallel.

In addition, in the above-described embodiments, as an example of the configuration of the image forming apparatus 1, description has been given of a case where the controller 100 is realized by one computer. However, the controller 100 may be realized by a plurality of computers. In addition, a program or data (for example, color correction data) which is fetched to the computer, data (for example, data for calibration) that is written by the computer, and the like may be dispersed and stored in a plurality of computers.

Hereinbefore, specific examples of the invention has been described in detail. However, these examples are illustrative only, and are not intended to limit the appended claims. Technologies described in the appended claims include various modifications and variations of the above-described specific examples.

According to the image forming apparatus according to the present disclosure, it is possible to perform calibration with accuracy while suppressing toner consumption and deterioration in productivity.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus that forms an output image corresponding to input image data on an image carrier by superimposing toner images of a plurality of colors, comprising a hardware processor that:
   detects color information of the output image for every pixel region;
   converts color information of the input image data for every pixel region and color information of the output image for every pixel region into indexes which define colors in predetermined color space coordinates;
   extracts a pixel region in which the color information of the output image is different from the color information of the input image data, and corrects the color information of the input image data with respect to the extracted pixel region on the basis of the color information of the output image; and
   stores the color information of the input image data, which is corrected in the hardware processor, as data for calibration in combination with the color information of the output image and image forming conditions when forming the output image.

2. The image forming apparatus according to claim 1, wherein the indexes which define colors are indexes related to a polar coordinate type angle or distance on a predetermined plane of the predetermined color space coordinates.

3. The image forming apparatus according to claim 2, wherein the indexes which define colors are indexes related to a polar coordinate type angle or distance in an ab-plane of Lab color space coordinates.

4. The image forming apparatus according to claim 2, wherein in a case where a difference in the indexes related to the angle between the color information of the input image data and the color information of the output image is equal to or greater than a threshold value, the hardware processor extracts a pixel region in which the color information of the output image is different from the color information of the input image data.

5. The image forming apparatus according to claim 2, wherein in a case where a difference in the indexes related to the distance between the color information of the input image data and the color information of the output image is equal to or greater than a threshold value, the hardware processor extracts a pixel region in which the color information of the input image data and the color information of the output image are different from each other.

6. The image forming apparatus according to claim 2, wherein in a case where the indexes, which relate to the distance, of the color information of the output image are equal to or greater than a threshold value, the hardware processor extracts a pixel region in which the color information of the input image data and the color information of the output image are different from each other.

7. The image forming apparatus according to claim 2, wherein the hardware processor determines a color of the toner image that is a target of correction that is performed with respect to the input image data on the basis of positive and negative of a difference in the indexes related to the angle or the distance between the color information of the input image data and the color information of the output image.

8. The image forming apparatus according to claim 1, wherein with respect to contour regions in which color information is different between adjacent pixel regions in the input image data, the hardware processor determines whether or not a pixel region, in which the color information of the output image is different from the color information of the input image data, exists.

9. The image forming apparatus according to claim 8, wherein when extracting a pixel region in which the color information of the output image is different from the color information of the input image data with respect to the contour regions, the hardware processor corrects the color information of the input image data with respect to both pixel regions on one side and on the other side of the contour regions.

10. The image forming apparatus according to claim 8, wherein the hardware processor determines the amount of correction when performing correction with respect to the color information of the input image data on the basis of a difference in the indexes related to the distance between the color information of the input image data and the color information of the output image in non-contour regions other than the contour regions.

11. The image forming apparatus according to claim 8, wherein the contour regions are regions which are spaced away from a boundary position, at which color information is different between adjacent pixel regions of the contour regions, to a position on the other side by a predetermined number of pixel regions.

12. The image forming apparatus according to claim 11, wherein the predetermined number of pixel regions are image regions having a size equal to or greater than a spot size detected by the hardware processor.

13. The image forming apparatus according to claim 1, wherein the hardware processor fluctuates color information of at least one pixel region in the input image data and forms the output image.

14. The image forming apparatus according to claim 1, wherein the hardware processor fluctuates predetermined image forming conditions and forms the output image corresponding to the input image data.

15. An image forming method of forming an output image corresponding to input image data on an image carrier by superimposing toner images of a plurality of colors, the method comprising:
   detecting color information of the output image for every pixel region;
   converting color information of the input image data for every pixel region and color information of the output image for every pixel region into indexes which define colors in predetermined color space coordinates;
   extracting a pixel region in which the color information of the output image is different from the color information of the input image data, and correcting the color information of the input image data with respect to the extracted pixel region on the basis of the color information of the output image; and
   storing the color information of the input image data, which is corrected, as data for calibration in combination with the color information of the output image and image forming conditions when forming the output image.

16. A non-transitory recording medium storing a computer readable program of an image forming apparatus that forms an output image corresponding to input image data on an image carrier by superimposing toner images of a plurality of colors, the program causing a computer to perform:
- detecting color information of the output image for every pixel region;
- converting color information of the input image data for every pixel region and color information of the output image for every pixel region into indexes which define colors in predetermined color space coordinates;
- extracting a pixel region in which the color information of the output image is different from the color information of the input image data, and correcting the color information of the input image data with respect to the extracted pixel region on the basis of the color information of the output image; and
- storing the color information of the input image data, which is corrected, as data for calibration in combination with the color information of the output image and image forming conditions when forming the output image.

* * * * *